(12) United States Patent
Oishi et al.

(10) Patent No.: US 11,825,145 B2
(45) Date of Patent: Nov. 21, 2023

(54) ON-VEHICLE COMMUNICATION DEVICE AND COMMUNICATION MANAGEMENT METHOD

(71) Applicant: MAZDA MOTOR CORPORATION, Hiroshima (JP)

(72) Inventors: Motoki Oishi, Hiroshima (JP); Satoshi Nakao, Hiroshima (JP); Yoshiki Maekawa, Hiroshima (JP); Eiji Okazaki, Hiroshima (JP); Hiroshi Ariki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/560,208

(22) Filed: Dec. 22, 2021

(65) Prior Publication Data
US 2022/0295136 A1 Sep. 15, 2022

(30) Foreign Application Priority Data

Mar. 12, 2021 (JP) ................................. 2021-040432

(51) Int. Cl.
*H04N 21/414* (2011.01)
*H04W 4/46* (2018.01)
(Continued)

(52) U.S. Cl.
CPC ....... *H04N 21/41422* (2013.01); *G06Q 20/16* (2013.01); *H04N 21/23418* (2013.01); *H04W 4/46* (2018.02)

(58) Field of Classification Search
CPC ....... G06Q 20/16; H04L 67/12; H04L 67/146; H04L 67/2895; H04N 21/23418;
(Continued)

(56) References Cited

U.S. PATENT DOCUMENTS

| | | | | |
|---|---|---|---|---|
| 4,169,226 A | * | 9/1979 | Fukuji | ....................... H03J 9/06 398/106 |
| 4,804,972 A | * | 2/1989 | Schudel | ................... H01Q 1/42 343/915 |

(Continued)

FOREIGN PATENT DOCUMENTS

| | | |
|---|---|---|
| CN | 112449321 A | 3/2021 |
| JP | 2019-012974 A | 1/2019 |
| JP | 2019-146099 A | 8/2019 |

*Primary Examiner* — Michael B. Pierorazio
(74) *Attorney, Agent, or Firm* — Studebaker & Brackett PC

(57) ABSTRACT

A communication management method includes: flag transmission of transmitting, to an on-vehicle communication device, identification flag information for identifying a function to be enabled among a plurality of functions of a vehicle, using a management server; port assignment of assigning different dedicated source ports for respective functions to be enabled based on the identification flag information, using the on-vehicle communication device, upon receipt of the identification flag information; and data communications for the respective functions assigned to the dedicated source ports in the port assignment via the dedicated source ports to allow a communication carrier to accumulate data traffic for the respective functions, using the on-vehicle communication device.

11 Claims, 14 Drawing Sheets

US 11,825,145 B2

Page 2

(51) Int. Cl.
*G06Q 20/16* (2012.01)
*H04N 21/234* (2011.01)

(58) Field of Classification Search
CPC .... H04N 21/41422; H04W 4/24; H04W 4/44; H04W 4/46; H04W 4/48; H04W 4/50
See application file for complete search history.

(56) References Cited

U.S. PATENT DOCUMENTS

| | | | | |
|---|---|---|---|---|
| 5,528,253 | A * | 6/1996 | Franklin | H01Q 1/427 343/872 |
| 6,023,242 | A * | 2/2000 | Dixon | H01Q 21/065 342/359 |
| 6,072,440 | A * | 6/2000 | Bowman | H01Q 1/42 343/872 |
| 6,538,612 | B1 * | 3/2003 | King | H01Q 1/125 343/765 |
| 6,710,749 | B2 * | 3/2004 | King | H01Q 1/125 343/765 |
| 6,832,070 | B1 * | 12/2004 | Perry | H04N 21/4782 348/E7.06 |
| 6,864,846 | B2 * | 3/2005 | King | H01Q 3/08 343/765 |
| 6,904,609 | B1 * | 6/2005 | Pietraszak | H04N 21/47 725/39 |
| 6,937,199 | B2 * | 8/2005 | King | H01Q 3/04 342/359 |
| 7,075,492 | B1 * | 7/2006 | Chen | H01Q 19/134 343/781 R |
| 7,076,202 | B1 * | 7/2006 | Billmaier | H04N 21/4334 455/66.1 |
| 7,239,274 | B2 * | 7/2007 | Lee | H01Q 1/3275 342/359 |
| 7,301,505 | B2 * | 11/2007 | King | H01Q 3/005 343/765 |
| 7,472,409 | B1 * | 12/2008 | Linton | H01Q 3/08 343/705 |
| 7,484,233 | B2 * | 1/2009 | Pietraszak | H04N 21/84 725/39 |
| 7,603,687 | B2 * | 10/2009 | Pietraszak | H04N 21/4782 725/50 |
| 7,679,573 | B2 * | 3/2010 | Shuster | H01Q 3/08 343/766 |
| 7,685,621 | B2 * | 3/2010 | Matsuo | H04N 21/4622 725/38 |
| 8,077,113 | B2 * | 12/2011 | Syed | H01Q 17/00 343/912 |
| 8,269,901 | B2 * | 9/2012 | Yi | H03J 7/186 348/731 |
| 8,368,611 | B2 * | 2/2013 | King | H01Q 3/08 725/63 |
| 8,743,872 | B2 * | 6/2014 | Chidambaram | H04L 47/6215 370/386 |
| 2003/0051246 | A1 * | 3/2003 | Wilder | H04N 7/17318 348/E7.071 |
| 2003/0214449 | A1 * | 11/2003 | King | H01Q 3/08 343/765 |
| 2004/0128689 | A1 * | 7/2004 | Pugel | H04N 5/50 725/39 |
| 2004/0160375 | A1 * | 8/2004 | King | H01Q 3/005 343/765 |
| 2004/0227655 | A1 * | 11/2004 | King | H01Q 1/3275 341/176 |
| 2005/0108751 | A1 * | 5/2005 | Dacosta | H04N 21/4135 348/E5.103 |
| 2005/0193415 | A1 * | 9/2005 | Ikeda | H04N 21/4586 725/50 |
| 2005/0225495 | A1 * | 10/2005 | King | H01Q 19/132 343/840 |
| 2006/0020978 | A1 * | 1/2006 | Miyagawa | H04B 17/27 725/72 |
| 2006/0139499 | A1 * | 6/2006 | Onomatsu | H04N 21/485 348/731 |
| 2006/0170603 | A1 * | 8/2006 | King | H01Q 19/10 343/765 |
| 2007/0152897 | A1 * | 7/2007 | Zimmerman | H01Q 1/28 343/757 |
| 2008/0129885 | A1 * | 6/2008 | Yi | H04N 21/4263 348/731 |
| 2008/0136722 | A1 * | 6/2008 | King | H01Q 1/42 342/359 |
| 2008/0184259 | A1 * | 7/2008 | Lesartre | G06F 11/2007 719/312 |
| 2008/0186242 | A1 * | 8/2008 | Shuster | H01Q 19/17 343/762 |
| 2008/0186409 | A1 * | 8/2008 | Kang | H04N 21/426 348/731 |
| 2008/0246677 | A1 * | 10/2008 | Shuster | H01Q 1/1257 343/766 |
| 2009/0135309 | A1 * | 5/2009 | DeGeorge | H04N 21/4345 348/732 |
| 2009/0260038 | A1 * | 10/2009 | Acton | H04N 21/482 725/49 |
| 2009/0310030 | A1 * | 12/2009 | Litwin | H04N 21/4345 348/731 |
| 2010/0214482 | A1 * | 8/2010 | Kang | H04N 5/50 348/731 |
| 2010/0315307 | A1 * | 12/2010 | Syed | H01Q 17/00 343/872 |
| 2011/0126232 | A1 * | 5/2011 | Lee | H04N 21/6405 707/E17.049 |
| 2013/0207868 | A1 * | 8/2013 | Venghaus | H01Q 19/12 343/840 |
| 2015/0161236 | A1 * | 6/2015 | Beaumont | G06F 16/48 707/736 |
| 2015/0161249 | A1 * | 6/2015 | Knox | G06F 16/337 707/737 |
| 2015/0382217 | A1 * | 12/2015 | Odio Vivi | H04B 17/336 370/252 |
| 2016/0173945 | A1 * | 6/2016 | Oh | H04N 21/2362 725/110 |
| 2016/0255394 | A1 * | 9/2016 | Yang | H04N 21/4348 725/131 |
| 2016/0261554 | A1 * | 9/2016 | Li | H04L 65/1104 |
| 2017/0064528 | A1 * | 3/2017 | Daly | H04W 4/02 |
| 2017/0317408 | A1 * | 11/2017 | Hamada | B62D 25/06 |
| 2018/0120169 | A1 * | 5/2018 | Jackson | G06Q 10/00 |
| 2018/0359541 | A1 * | 12/2018 | Park | G06F 9/54 |
| 2019/0037418 | A1 * | 1/2019 | Gunasekara | H04W 24/02 |
| 2019/0079659 | A1 * | 3/2019 | Adenwala | G06F 3/04842 |
| 2019/0182267 | A1 * | 6/2019 | Aher | G06F 11/30 |
| 2019/0245811 | A1 * | 8/2019 | Sergeev | H04L 63/02 |
| 2019/0335221 | A1 * | 10/2019 | Walker | H04L 1/0041 |
| 2020/0099605 | A1 * | 3/2020 | Mayrand | H04L 65/70 |
| 2020/0228883 | A1 * | 7/2020 | Park | H04N 21/845 |
| 2020/0297955 | A1 * | 9/2020 | Shouldice | G16H 40/63 |
| 2020/0305003 | A1 * | 9/2020 | Landa | H04W 4/40 |
| 2021/0014165 | A1 | 1/2021 | Kimura et al. | |
| 2021/0026573 | A1 * | 1/2021 | Yamaguchi | G06F 3/126 |
| 2021/0067929 | A1 * | 3/2021 | Hirano | H04L 12/40 |
| 2022/0294740 | A1 * | 9/2022 | Burkhalter, Jr. | G06N 20/00 |

* cited by examiner

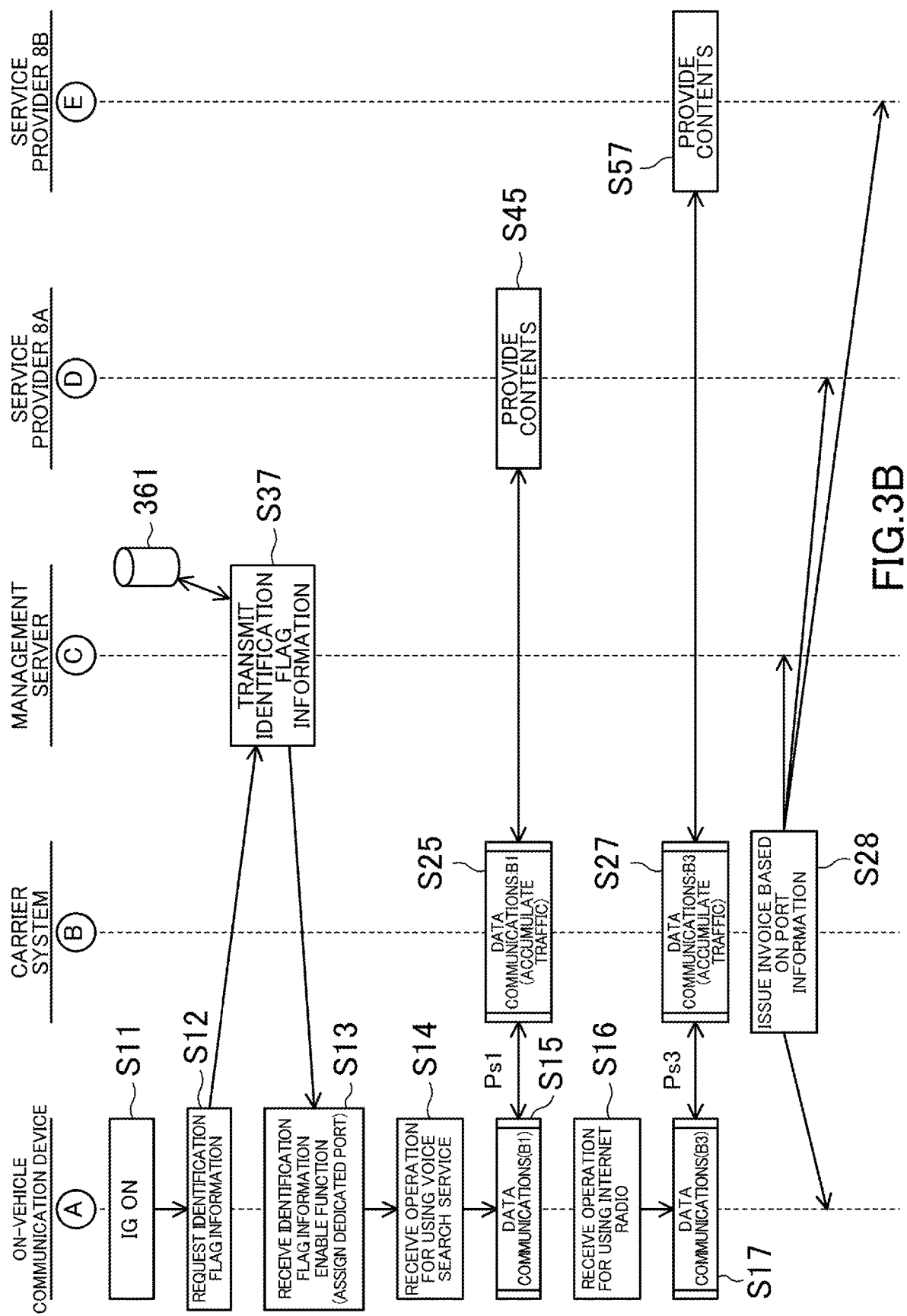

FIG.4

| DEDICATED PORT | SERVICE PROVIDER | SERVICE NAME | CHARGE DESTINATION ||
| --- | --- | --- | --- | --- |
| | | | VEHICLE TYPE A | VEHICLE TYPE B |
| Ps1 | 8A (COMPANY A) | VOICE SEARCH SERVICE | USER100% | USER50% MANUFACTURER50% |
| Ps2 | 8A (COMPANY A) | STREAMING SERVICE | PROVIDER100% | PROVIDER100% |
| Ps3 | 8B (COMPANY B) | INTERNET RADIO | PROVIDER100% | PROVIDER100% |
| Ps4 | 8B (COMPANY B) | PROVIDE SURROUNDING INFORMATION | PROVIDER100% | PROVIDER100% |
| Ps5 | 8C (COMPANY C) | PAYMENT APP DEDICATED TO SHOP | PROVIDER100% | PROVIDER100% |
| Ps6 | VEHICLE MANUFACTURER | DRIVER ASSISTANCE SERVICE | MANUFACTURER 100% | MANUFACTURER 100% |
| Ps7 | UNASSIGNED | UNASSIGNED | – | – |
| Ps8 | UNASSIGNED | UNASSIGNED | – | – |
| ... | ... | ... | ... | ... |

FIG.5

| DEDICATED PORT | DATA TRAFFIC | COMPANY A | COMPANY B | COMPANY C | MANUFACTURER | USER |
|---|---|---|---|---|---|---|
| Ps1 | B1 | — | — | — | — | B1 |
| Ps2 | B2 | B2 | — | — | — | — |
| Ps3 | B3 | — | B3 | — | — | — |
| Ps4 | B4 | — | B4 | — | — | — |
| Ps5 | B5 | — | — | B5 | — | — |
| Ps6 | B6 | — | — | — | B6 | — |
| CHARGE | | B2 | B3+B4 | B5 | B6 | B1 |

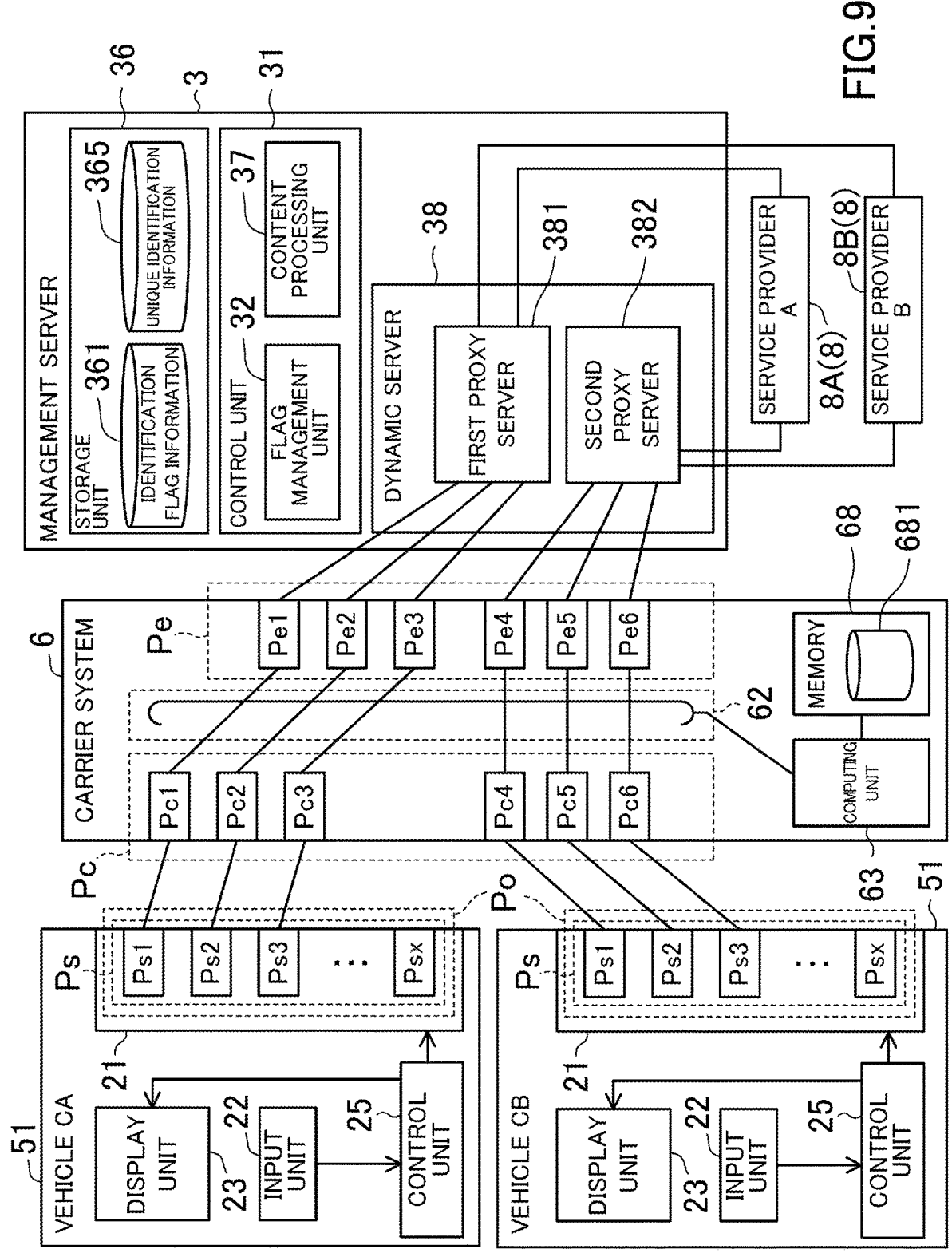

FIG.11

| IDENTIFICATION CODE | VEHICLE TYPE (CLASS) | DYNAMIC SERVER | DEDICATED PORT | SERVICE PROVIDER | SERVICE NAME | CHARGE DESTINATION |
|---|---|---|---|---|---|---|
| VEHICLE A | CA1 | VEHICLE TYPE A (HIGH) | FQ1 | Ps1 | 8A (COMPANY A) | VOICE SEARCH SERVICE | USER100% |
| | | | | Ps2 | 8A (COMPANY A) | STREAMING SERVICE | PROVIDER100% |
| | | | | Ps3 | 8B (COMPANY B) | INTERNET RADIO | PROVIDER100% |
| | | | | ... | ... | ... | ... |
| VEHICLE B | CA2 | VEHICLE TYPE B (LOW) | FQ2 | Ps1 | 8A (COMPANY A) | VOICE SEARCH SERVICE | USER50% MANUFACTURER50% |
| | | | | Ps2 | 8A (COMPANY A) | STREAMING SERVICE | USER50% MANUFACTURER50% |
| | | | | Ps3 | 8B (COMPANY B) | INTERNET RADIO | USER100% |
| | | | | ... | ... | ... | ... |

ON-VEHICLE COMMUNICATION DEVICE AND COMMUNICATION MANAGEMENT METHOD

CROSS REFERENCE TO RELATED APPLICATIONS

This application claims priority to Japanese Patent Application No. 2021-040432 filed on Mar. 12, 2021. The entire disclosures of these applications are incorporated by reference herein.

TECHNICAL FIELD

The present disclosure belongs to the technical field related to an on-vehicle communication device mounted on a vehicle and a communication management method of managing communications between a management server and the on-vehicle communication device.

BACKGROUND

In general information communications using personal computers and/or other devices, source port randomization is performed which changes a plurality of transmission source ports to ensure the security. For example, a transmission source port is selected in view of load distribution in a known method (see, e.g., Japanese Unexamined Patent Publication No. 2019-146099).

Japanese Unexamined Patent Publication No. 2019-12974 discloses a communication system that sets a bearer of the costs for data communications on an item-by-item basis, and counts the cumulative value of the data traffic used by each bearer. In the communication system according to Japanese Unexamined Patent Publication No. 2019-12974, a communication device and a server have data communications after adding, to data, an identifier indicating the bearer of the communication costs.

SUMMARY

However, as in Japanese Unexamined Patent Publication No. 2019-12974, the data communications made between a communication device and a server after adding, to data, an identifier indicating the bearer of the communication costs may require complicated processing. For example, assume that a vehicle receives stream data such as music from a certain service provider (a first service provider), and exchanges data for another service with another service provider (a second service provider) in the same time period. For example, since stream data is temporally continuous data, the data exchanged with the first service provider may be hardly distinguishable from the data exchanged with the second service provider. For more accurate distinction, an identifier may be added at a shorter data interval or for each packet. There is however a need for a service provider to add an identifier at a shorter interval, which causes more complex processing of dividing data at a communication carrier (and/or a carrier system) between the vehicle and the service provider and is thus unrealistic.

The present disclosure was made in view of the problems. It is an aspect of the present disclosure to provide a communication management method that makes data traffic distinguishable from service content to service content and/or from service provider to service provider and allows the division of the costs for data communications into charge destinations.

In one aspect, the present disclosure is directed to, a communication management method of managing a communication between an on-vehicle communication device and a communication carrier using the on-vehicle communication device and a management server, the on-vehicle communication device being mounted on a vehicle, the management server placed outside the vehicle and configured to manage the on-vehicle communication device. The communication management method includes: flag transmission of transmitting, to the on-vehicle communication device, identification flag information for identifying a function to be enabled among a plurality of functions of the vehicle, using the management server; port assignment of assigning different dedicated source ports for respective functions to be enabled based on the identification flag information, using the on-vehicle communication device, upon receipt of the identification flag information; and data communications for the respective functions assigned to the dedicated source ports in the port assignment via the dedicated source ports to allow a communication carrier to accumulate data traffic for the respective functions, using the on-vehicle communication device.

In the communication management method described above, transmission source ports are set for the respective functions to be enabled. That is, the transmission source ports are fixed for the respective functions to be enabled. This method allows the division of the communication costs into charge destinations based on the functions without requiring any complicated processing, such as reading identifiers from the data transmitted by communication carriers and classifying the data. In addition, since different transmission source ports are used, the data traffic is clearly dividable based on the respective functions and/or services even in data communications made at the same time.

In the communication management method described above, the identification flag information includes port designation information designating a transmission source port for an assignment destination so that the different dedicated source ports are assigned for the respective functions. The communication management method further includes: information provision of providing the communication carrier with information on the transmission source ports assigned for the respective functions, using the management server.

With this method, the communication carrier easily divides communication data into functions to be enabled, and easily performs the processing of charging different charge destinations for the respective functions to be enabled.

In the communication management method described above, registration of registering, in the management table, identification flag information for identifying a function to be enabled, upon receipt of contract information on a contract for the function between the vehicle and a service provider that provides a service to the vehicle, using the management server. The flag transmission includes transmitting, as the identification flag information for identifying the function to be enabled, the identification flag information registered in the registration, using the management server.

According to the aspect described above, since the management server sets the dedicated transmission ports for the respective functions based on the contract information received from the service provider, the service provider only needs to provide the contract information to the management server. That is, without requesting any registration or other procedure from the service provider, the data traffic is clearly dividable based on the respective functions and/or services.

The management server includes a plurality of reverse proxy servers. The data communications of the on-vehicle communication device in the data communications are executed via the reverse proxy servers assigned based on the identification flag information.

According to the aspect described above, employed here is the stage structure of dividing communications using dedicated transmission source ports, and using reverse proxy servers. For example, service providers are divided based on the ports, and the vehicle classes are divided based on the FQDNs. In this manner, even if a certain service provider is charged in different ways from class to class, no complicated processing is required.

In one aspect, the present disclosure is directed to an on-vehicle communication device for connecting an on-vehicle device mounted on a vehicle to an external network. The on-vehicle communication device includes: a storage unit configured to store a correspondence relationship between functions to be enabled out of a plurality of functions of the on-vehicle device and different transmission source ports assigned for the respective functions; and a control unit configured to assign a transmission source port different from the transmission source ports for a new function to be enabled different from the functions stored in the storage unit, upon receipt of new identification flag information for identifying the new function from an outside of the vehicle, stores information on the assignment, and perform control for information communications for the respective functions via the transmission source ports.

Like the communication management method described above, the on-vehicle communication device according to this aspect allows the division of the communication costs into charge destinations based on the functions without requiring any complicated processing. In addition, since different transmission source ports are used, the data traffic is clearly dividable based on the respective functions and/or services even in data communications made at the same time.

ADVANTAGES

As described above, the present disclosure divides the communication costs into the charge destinations based on the transmission source ports. This allows the division of the communication costs into the charge destinations based on the functions without requiring any complicated processing.

BRIEF DESCRIPTION OF THE DRAWINGS

FIG. 3B is another flowchart showing the operation example of the communication management system according to one or more aspects of the present disclosure.

FIG. 4 shows an example correspondence table stored in a memory.

FIG. 5 is a table showing example charges in charging processing by a carrier system.

FIG. 9 is a block diagram showing a configuration example of a communication management system according to one or more aspects of the present disclosure.

FIG. 11 shows another example correspondence table stored in the memory.

DETAILED DESCRIPTION

Exemplary embodiments will be described in detail below with reference to the drawings. The embodiments described below are merely examples in nature, and the scope of the present disclosure should not be interpreted in a limited manner.

First Embodiment

—Communication Management System—

Figure 1:
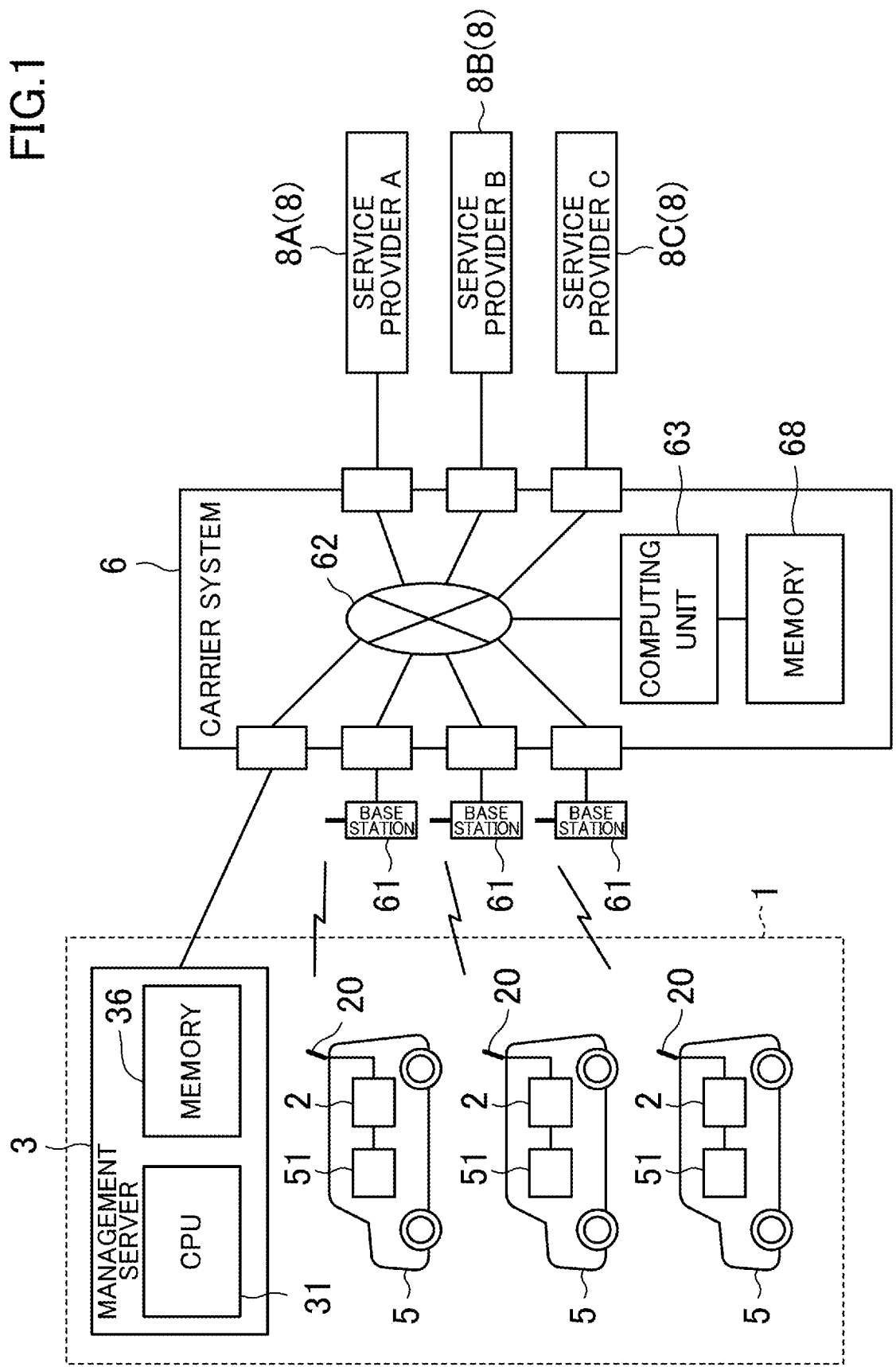
FIG. 1 is a conceptual diagram showing a configuration example of a communication management system according to one or more aspects of the present disclosure.
Figure 2:
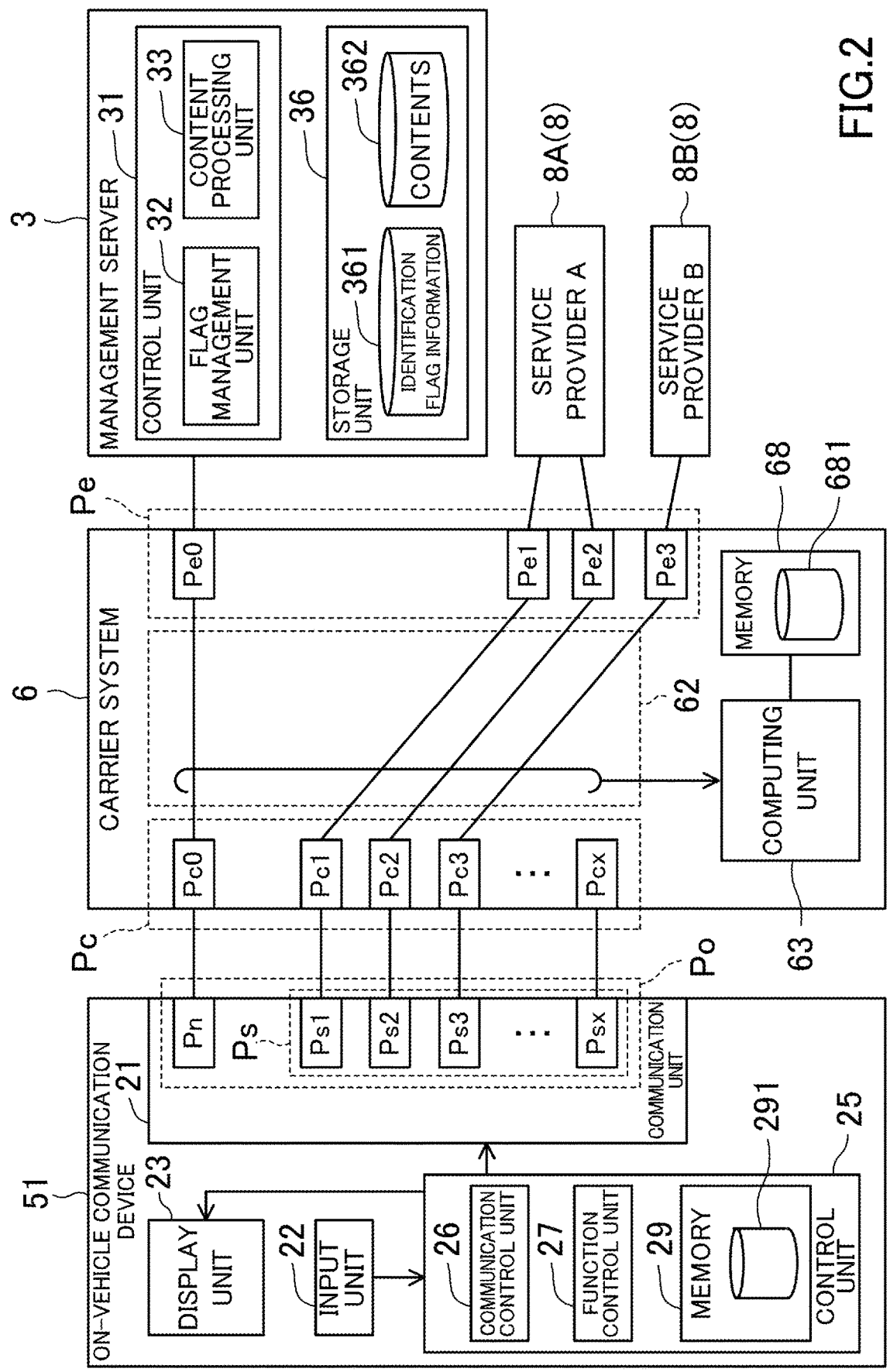
FIG. 2 is a block diagram showing a configuration example of the communication management system according to one or more aspects of the present disclosure.

FIGS. 1 and 2 show a configuration example of a communication management system according to a first embodiment. FIG. 1 is a conceptual diagram showing an overall configuration. FIG. 2 is a block configuration diagram mainly showing connection relationships of constituent elements related to the present disclosure.

As shown in FIG. 1, a communication management system 1 includes: on-vehicle communication devices 2 mounted on respective vehicles 5; and a management server 3 away from the vehicles 5 and configured to manage the on-vehicle communication devices 2. The communication management system 1 provides various services with different contents from different providers via the on-vehicle communication devices 2 to the vehicles 5, and manages the communications between the vehicles 5 and service providers 8 that provide occupant services. More specifically, the communication management system 1 allows a carrier system 6 managed by a communication carrier to divide the costs for the data communications between on-vehicle devices 51 mounted on the vehicles 5 and the service providers 8 into charge destinations based on transmission source ports.

Here, the on-vehicle devices 51 are not particularly limited, but may include a car audio system, a car navigation system, a head-up display, a drive recorder, and a detachable tablet connected to an external network via an on-vehicle antenna.

The occupant services are, for example, provided to occupants through the on-vehicle devices 51 and/or used by the occupants through the on-vehicle devices 51. The specific contents of the services are not particularly limited. Examples of the occupant services include: (1) a voice search service of searching various information using a car navigation system, for example, providing entertainment contents such as music and/or video streams played on a car audio system (hereinafter collectively referred to as a "streaming service"); (2) providing surrounding information such as an Internet radio program using a car audio system, tourist attractions and/or restaurants according to the location of a vehicle and the destination registered in the car navigation system; (3) providing a tablet device with a payment application service exclusive to a shop, for example, once a vehicle enters a drive-through, for example; and (4) providing a monitoring service during parking and/or a road support service while traveling, through videos of a drive recorder.

—On-Vehicle Communication Device—

Each on-vehicle communication device 2 performs relay processing of relaying data communications between the on-vehicle device 51 mounted on the associated one of the vehicles and a network outside the vehicle (e.g., the carrier system 6 managed by the communication carrier).

As shown in FIGS. 1 and 2, each on-vehicle communication device 2 includes an antenna 20, a communication unit 21, an input unit 22, a display unit 23, and a control unit 25.

(Antenna)

The antenna 20 outputs radio waves to the outside of the vehicle 5 (hereinafter, simply referred to as "outside the vehicle") and receives radio waves from the outside of the vehicle. The on-vehicle communication device 2 is connected to a nearest base station 61, for example, via the antenna 20. The base station 61 is connected to a network 62 of the carrier system 6. The network 62 of the carrier system 6 is connected to the management server 3 and the servers of the service providers (hereinafter, simply referred to as the "service providers 8"). Accordingly, the on-vehicle communication device 2 establishes bidirectional data communications with the management server 3 or the service providers 8 through the carrier system 6. The on-vehicle communication device 2 and the carrier system 6 communicate with each other under the transmission control protocol/Internet protocol (TCP/IP), for example.

(Communication Unit)

As shown in FIG. 2, the communication unit 21 includes a plurality of input/output ports Po. The input/output ports Po include a plurality of reserved ports (not shown); a first port Pn to be connected to the management server 3; and dedicated transmission source ports (hereinafter referred to as "dedicated ports Ps"). Assigned to the dedicated ports Ps are source port numbers different from function to function to be enabled (hereinafter referred to as a "function to be enabled"), among the functions of the on-vehicle device under the control of a communication control unit 26.

Upon receipt of data, the carrier system 6 identifies, as the transmission source of the data, one of the input/output ports Po of the on-vehicle communication device 2. After that, when the data is output from the carrier system 6 to the management server 3, the management server 3 determines the communication status at the source port Pe of the carrier system 6 (hereinafter, simply referred to as a "port Pe").

Details of how to assign the dedicated ports Ps, and the communications among the on-vehicle communication devices 2, the carrier system 6, and the management server 3 will be described later. The reserved ports have a typically known configuration. Detailed description thereof will thus be omitted here.

In this embodiment, the dedicated ports Ps include the dedicated ports Ps1 to Psx, where x is a positive integer. The dedicated ports Ps1 to Psx are connected to destination ports Pc1 to Pcx of the carrier system 6, respectively. On the other hand, the first port Pn is connected to a destination port Pc0. In the carrier system 6, each of the destination ports Pc0 to Pcx is connected to corresponding one of connection destinations (e.g., the management server 3 and/or the service providers 8) via the network 62.

(Input Unit)

The input unit 22 functions to receive operation inputs and/or voice inputs from an occupant. The form of an input received by the input unit 22 is not particularly limited. Although not shown in detail, examples of the input unit 22 include an operation switch and/or a touch panel for receiving the operation inputs, and a microphone for receiving the voice inputs. The input unit 22 may be an on-vehicle camera (not shown) that monitors gestures, conditions, and/or other aspects of the occupant (hereinafter, collectively referred to as "movement of the occupant") and receives the movement of the occupant as inputs.

(Display Unit)

The display unit 23 functions to display the services provided by the service providers 8 and/or the operation statuses at the input unit 22, for example. The form of the display unit 23 is not particularly limited. Although not shown in detail, examples of the display unit 23 include a display screen of a car navigation system, a head-up display, and a display screen of a tablet. The display unit 23 may be a touch panel of a contact or non-contact type, and may also serve as the input unit 22.

(Control Unit)

The control unit 25 includes the communication control unit 26 and a function control unit 27. The communication control unit 26 controls the communications between the on-vehicle communication device 2 and an external network (e.g., the carrier system 6). The function control unit 27 controls the functions provided by the on-vehicle device 51.

The control unit 25 is a microprocessor with one or more chips, and includes a central processing unit (CPU) and a memory, for example. The memory stores modules that are software executable by the microprocessor. The functions of the components of the control unit 25 are implemented by the microprocessor executing the respective modules stored in the memory. Each function of the control unit 25 may be fulfilled by a single module, and/or a single function may be fulfilled by a plurality of modules in cooperation or cooperation. Note that a plurality of microprocessors and memories 29 may be provided.

(Storage Unit (Memory))

In addition to the modules described above for operating the microprocessor, a memory 29 stores a correspondence table 291. The correspondence table 291 indicates the correspondence relationship between the functions to be enabled of the on-vehicle device 51 and the dedicated ports Ps assigned to the respective functions to be enabled. FIG. 4 shows an example of the correspondence table 291. The details of the correspondence table 291 shown in FIG. 4 will be described later. The memory 29 is an example of the storage unit.

The memory 29 may be, for example, a random-access memory (RAM) built in a chip of the control unit 25, and/or an external storage device such as a solid-state drive (SSD), and/or a hard disk drive (HDD).

(Communication Control Unit)

The communication control unit 26 refers to the correspondence table 291 to assign different dedicated ports to the functions to be enabled, and performs control for information communications for the assigned functions via the respective dedicated ports Ps.

Upon receipt of identification flag information 361 for identifying a new function to be enabled from the outside of the vehicle, the communication control unit 26 assigns a dedicated port Ps to the new functions different from the other functions stored in the memory 29. The communication control unit 26 then registers the correspondence relationship between the new function to be enabled and the assigned dedicated port Ps in the correspondence table 291. This allows information communications for the assigned functions via the dedicated ports Ps. The identification flag information 361 will be described later in "Operation of Communication Management System".

(Function Control Unit)

The function control unit 27 controls the functions (hereinafter, referred to as "on-vehicle functions") provided by the on-vehicle device 51. Specifically, for example, upon receipt of an input of a request for enabling an on-vehicle function via the input unit 22, the function control unit 27 checks whether the on-vehicle function is active with reference to the correspondence table 291. If the on-vehicle function requested by the occupant is active, the function control unit 27 enables the on-vehicle function and performs control to provide the occupant with the service corresponding to the input. For example, when the on-vehicle function itself is inactive, the MENU of the on-vehicle function is not displayed on the display unit 23. For example, as a condition for enabling the on-vehicle function, after the ignition system is turned on and the engine control unit (ECU, not shown) is woken up, the function control unit 27 may obtain the latest setting value from a flag management unit 32 of the management server 3. If the flag is on, the function control unit 27 may enable the on-vehicle function. Detailed operation will be described later in "Operation of Communication Management System".

—Management Server—

The management server 3 is located away from the vehicles 5 and functions to manage the on-vehicle communication devices 2 mounted on the respective vehicles 5. The management server 3 includes a control unit 31 and a storage unit 36.

(Control Unit)

The control unit 31 includes the flag management unit 32 and a content processing unit 33. The flag management unit 32 manages the flag information including the correspondence table 291 of each vehicle 5. The content processing unit 33 processes the contents to be provided when the management server provides, as one of the service providers 8, services to the vehicle 5. That is, in addition to the operation as the management server 3, the management server 3 may operate as one of the service providers 8. For example, this includes the case where a vehicle manufacturer, which provides a vehicle 5 mounted with an on-vehicle communication device 2 and also manages and operates the management server 3, provides various contents and services to the user (e.g., the occupant) of the vehicle 5.

The control unit 31 is a microprocessor with one or more chips, and includes a CPU and a memory, for example. The memory stores modules that are software executable by the microprocessor. The functions of the components of the control unit 31, which will be described later, are implemented by the microprocessor executing the respective modules stored in the memory. Each function of the control unit 31 may be fulfilled by a single module, and/or a single function may be fulfilled by a plurality of modules in cooperation or cooperation. Note that a plurality of microprocessors and memories may be provided.

(Storage Unit)

The storage unit 36 stores the identification flag information 361 on each vehicle 5 to be managed, and content information 362 to be provided when the management server provides, as one of the service providers 8, service to the vehicle 5. The identification flag information 361 is updated upon receipt of each request for registration from a service provider 8. The storage unit 36 may be, for example, a storage device such as a solid-state drive (SSD) and/or a hard disk drive (HDD).

In response to a request from each vehicle 5, the management server 3 extracts the latest identification flag information 361 unique to the vehicle 5 from the storage unit 36 and provides the extracted identification flag information.

Operation Example 1 of Communication Management System

Figure 3A:
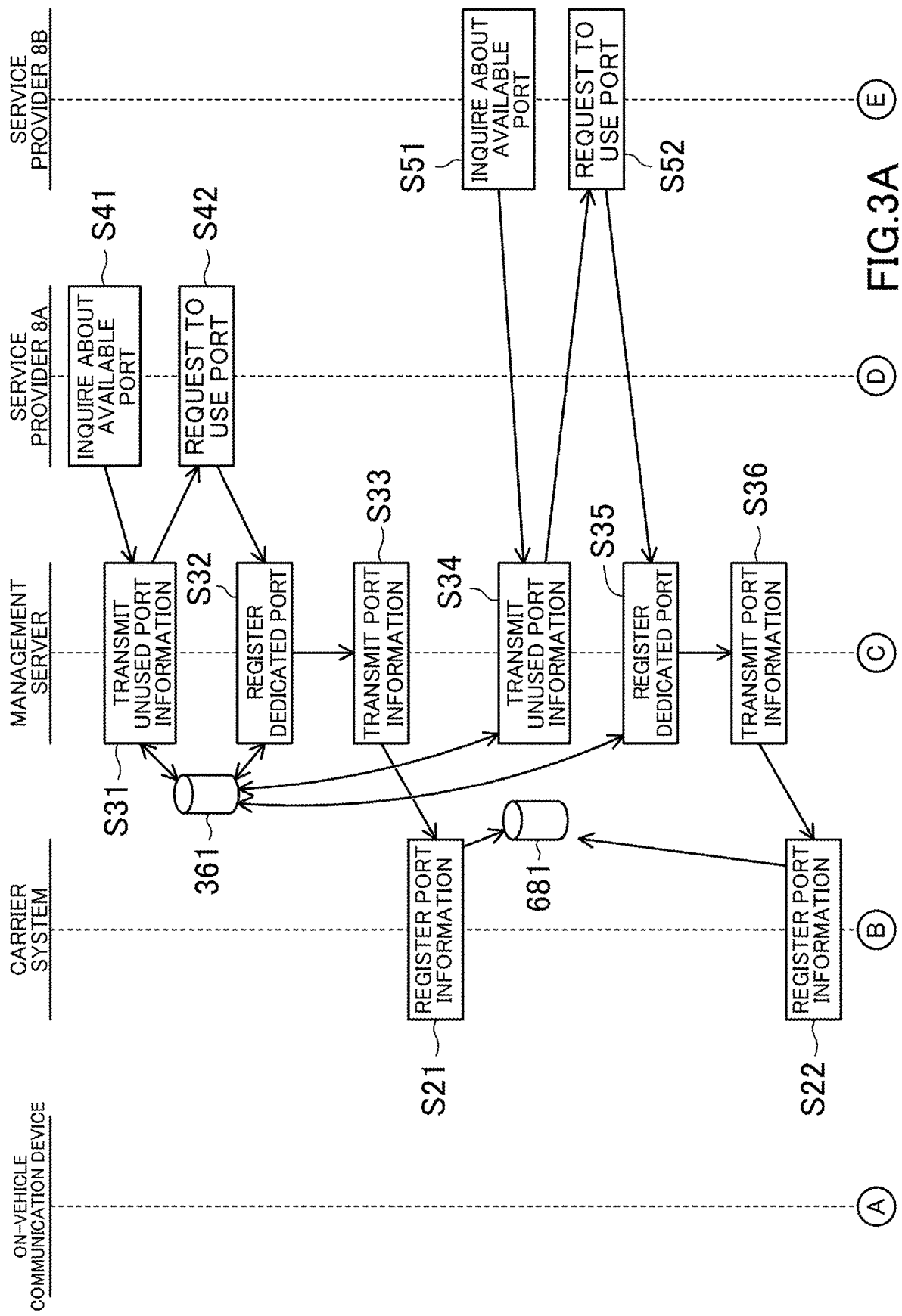
FIG. 3A is a flowchart showing an operation example of the communication management system according to one or more aspects of the present disclosure.

FIGS. 3A and 3B are flowcharts showing an example operation of the communication management system.

FIG. 3A shows the operation of port registration in which the management server 3 receives requests for port registration from the service providers 8. Here, the following will be described as an example of port registration by the service providers 8. A service provider 8A registers a dedicated port Ps1 for a voice search service, and a dedicated port Ps2 for a streaming service. A service provider 8B registers a dedicated port Ps3 for an Internet radio, and a dedicated port Ps4 for providing surrounding information.

FIG. 4 shows an example of the correspondence table 291 after the processing of the port registration. In the following description, at the start of the flow in FIG. 3A, no information on the dedicated ports Ps1 to Psx is registered in the correspondence table 291 shown in FIG. 4. In addition, unused dedicated ports Ps are referred to as "unused ports".

First, in step S41, the service provider 8A inquires of the management server 3 about information on available ports.

Upon receipt of the inquiry from the service provider 8A, the management server 3 refers to the identification flag information 361 in the storage unit 36 and provides the service provider 8A with information (hereinafter, referred to as "unused port information") indicating unused ports for a vehicle 5 (hereinafter, referred to as a "target vehicle 5") about which the inquiry has been received (step S31). As described above, at this time point, no information on the dedicated port Ps is registered in any of the dedicated ports Ps1 to Psx. The management server 3 thus notifies the service provider 8A of the fact that the dedicated ports Ps1 to Psx are the unused ports, as the unused port information for the target vehicle 5.

Upon receipt of the unused port information for the target vehicle 5 from the management server 3, the service provider 8A requests to register the unused ports for the services to be provided (step S42). Here, the service provider 8A requests to register the dedicated port Ps1 for the "voice search service" and the dedicated port Ps2 for the "streaming service".

Upon receipt of the request to register the dedicated ports Ps1 and Ps2 from the service provider 8A, the management server 3 registers the information on the dedicated ports Ps1 and Ps2 requested by the service provider 8A in the identification flag information 361 on the target vehicle 5 (step S32). The contents registered in the correspondence table 291 are not particularly limited, but may be the identification information for identifying the registered services. In other words, the contents may be the identification information for identifying a new function to be enabled among the functions of the on-vehicle device. For example, the contents to be registered in the correspondence table 291 are the same as the identification flag information 361 of the management server 3.

The identification flag information 361 is associated with service identification information and assignment information. For example, the service identification information includes: a company name and/or a brand name identifying one of the service providers 8, and/or a service name identifying the service itself provided by the service provider 8. The assignment information indicates a transmission source port (i.e., a dedicated port Ps) assigned for each of the service identification information. FIG. 4 shows an example where the service providers 8 and the names of the services to be provided are registered in association with the dedicated ports Ps, as the identification flag information 361. For example, if one dedicated port Ps is set for each service provider 8, there is no need to register the service names as the identification flag information 361. Similarly, if one dedicated port Ps is set for each service to be provided without depending on the service providers 8, there is no need to register the service providers 8 as the identification flag information 361. In addition, in FIG. 4, charge destination information for data communications at each dedicated port Ps is associated in the correspondence table 291. As shown in FIG. 4, different charge destinations may be set from vehicle type to vehicle type and/or from class to class.

Referring back to FIG. 3A, in the next step S33, the management server 3 notifies the carrier system 6 of the fact that the data communications for the voice search service by the service provider 8A are made via the dedicated port Ps1 and the data communications for the streaming service are made via the dedicated port Ps2.

Upon receipt of the notification from the management server 3, the carrier system 6 registers the information received from the management server 3 in a database 681 of a storage unit 68 (step S21). Accordingly, the same information as the identification flag information 361 of the management server 3 is shared with the carrier system 6. Based on the received assignment information (i.e., the information in the correspondence table 291) on the dedicated ports Ps, the carrier system 6 connects the dedicated ports Ps1 and Ps2 to ports Pe1 and Pe2 for the service provider 8A, respectively, in the network 62.

Similarly, in step S51, the service provider 8B inquires of the management server 3 about the information on ports available for the target vehicle 5.

Upon receipt of the inquiry from the service provider 8B, the management server 3 refers to the identification flag information 361 in the storage unit 36 and provides the service provider 8B with the unused port information (step S34). According to the identification flag information 361 on the target vehicle 5, the dedicated ports Ps1 and Ps2 are registered for the services by the service provider 8A. The management server 3 thus notifies the service provider 8B of the fact that the dedicated ports Ps3 to Psx are the unused ports, as the unused port information for the target vehicle 5.

Upon receipt of the unused port information for the target vehicle 5 from the management server 3, the service provider 8B requests to register the unused ports for the services to be provided (step S52). Here, the service provider 8B requests to register the dedicated port Ps3 for an Internet radio, and the dedicated port Ps4 for a surrounding information providing service, respectively.

Upon receipt of the request to register the dedicated ports Ps3 and Ps4 from the service provider 8B, the management server 3 registers the information on the dedicated ports Ps3 and Ps4 in the identification flag information 361 on the target vehicle 5 stored in the storage unit 36 (step S35).

In the next step S36, the management server 3 notifies the carrier system 6 of the fact that the data communications for the Internet radio by the service provider 8B are made via the dedicated port Ps3 and the data communications for the surrounding information providing service by the service provider 8B are made via the dedicated port Ps4.

Upon receipt of the notification from the management server 3, the carrier system 6 registers the information received from the management server 3 in the database 681 of the storage unit 68 (step S22). Accordingly, the same information on the target vehicle 5 as the identification flag information 361 of the management server 3 is shared with the carrier system 6. In addition, based on the received assignment information (i.e., the identification flag information 361) on the dedicated ports Ps, the dedicated ports Ps3 and Ps4 are connected to the ports Pe3 and Pe4 in the network 62, respectively.

Note that the processing of the port registration described above may be performed by the vehicle manufacturer and/or others in advance before the vehicle is delivered to the user, such as at the time of manufacture and/or before shipment of the vehicle. The processing may be set by a maintenance company and/or others other than the service providers 8 after the sale of the vehicle (see, e.g., a dedicated port Ps6 in FIG. 4).

Now, an operation of the communication management system 1 after turning on the ignition switch of a vehicle 5 will be described with reference to FIG. 3B.

An example will be described in the operation of the communication management system 1 shown in FIG. 3B where the management server 3 executes the flag transmission, and the on-vehicle communication device 2 then executes the port assignment and the data communication.

In the flag transmission, the management server 3 transmits, to the on-vehicle communication device 2 of the target vehicle 5, identification flag information for identifying a function to be enabled of the on-vehicle device 51 of the target vehicle 5. In the port assignment, upon receipt of the identification flag information, the on-vehicle communication device 2 assigns dedicated ports Ps for respective functions to be enabled. In the data communications, the on-vehicle communication device 2 executes input and output of the data for the functions assigned to the respective dedicated ports Ps in the port assignment via the dedicated ports Ps.

Accordingly, the carrier system 6 accumulates the data traffic for the respective functions to be enabled.

A detailed description follows with reference to FIG. 3B.

In step S11, the ignition switch (not shown) of the target vehicle 5 is turned on. In step S12, the on-vehicle communication device 2 of the target vehicle 5 requests the latest identification flag information 361 for identifying a function to be enabled from the management server 3.

Upon receipt of the request for the identification flag information 361 from the on-vehicle communication device 2 of the target vehicle 5, the management server 3 refers to the storage unit 36 and transmits the latest identification flag information 361 to the on-vehicle communication device 2 of the target vehicle 5 (step S37).

Upon receipt of the identification flag information 361 from the management server 3, the on-vehicle communication device 2 executes the processing of enabling the function based on the identification flag information 361 (step S13). Specifically, the on-vehicle communication device 2 assigns different dedicated ports Ps to the respective functions to be enabled, based on the identification flag information 361. Since the identification flag information 361 includes the assignment information on the dedicated ports Ps of the service identification information, the on-vehicle communication device 2 assigns the dedicated ports Ps indicated by the identification flag information 361 to the respective functions to be enabled. The enabling of a function includes, for example, allowing an occupant to use the function when requested by the user.

For example, upon receipt of the information on the service providers 8A and 8B in the table shown in FIG. 4 as the identification flag information 361, the communication control unit 26 enables applications for the voice search service and the streaming service provided by the service provider 8A. In addition, the communication control unit 26 makes a setting so that the data communications for the voice search service are made via the dedicated port Ps1 and the data communications for the streaming service are made via the dedicated port Ps2. Similarly, the communication control unit 26 enables applications for the Internet radio and the surrounding information providing service by the service provider 8B. In addition, the communication control unit 26 makes a setting so that the data communications for the Internet radio are made via the dedicated port Ps3 and the data communications for the surrounding information providing service are made via the dedicated port Ps4.

In subsequent step S14, for example, upon receipt of an operation for using the voice search service provided by the service provider 8A, the application for the voice search service starts. The on-vehicle communication device 2 starts data communications with the service provider 8A via the dedicated port Ps1. Specifically, a request for voice search is transmitted from the on-vehicle communication device 2 to the service provider 8A (step S15), and a search result is, as a response, returned from the service provider 8A to the on-vehicle communication device 2 (step S45).

A computing unit 63 of the carrier system 6 accumulates the data traffic for the request from the on-vehicle communication device 2 to the service provider 8A and the data traffic for the response from the service provider 8A to the on-vehicle communication device 2. The storage unit 68 stores the accumulated data as the traffic used by the dedicated port Ps1, that is, data traffic B1 used for the voice search service (step S25).

For example, in step S16, upon receipt of a request to use the Internet radio provided by the service provider 8B, the application for the Internet radio is enabled. The on-vehicle communication device 2 starts data communications with the service provider 8B via the dedicated port Ps3. Specifically, a request for a radio channel selected by an occupant is transmitted from the on-vehicle communication device 2 to the service provider 8B (step S17), and audio stream data of the Internet radio is, as a response, returned from the service provider 8B to the on-vehicle communication device 2 (step S57). The computing unit 63 of the carrier system 6 accumulates the data traffic for the request from the on-vehicle communication device 2 to the service provider 8B and the data traffic for the response from the service provider 8B to the on-vehicle communication device 2. The storage records the accumulated data as the traffic used by the dedicated port Ps3, that is, data traffic B3 used for the Internet radio (step S27).

The computing unit 63 of the carrier system 6 accumulates the data traffic (i.e., request and response data) for each dedicated port Ps for each predetermined period (e.g., for each month), and executes the charging processing based on a result of the accumulation. The communication carrier charges a charge destination according to the charge destination information, for the amount corresponding to the data traffic for the predetermined period (step S28). The charge destination information is transmitted in association with the identification flag information received from the management server 3.

FIG. 5 shows an example correspondence relationship between data traffic at the dedicated ports Ps1 to Ps6 and the charge destinations for the costs for the data communications. FIG. 5 shows example charges made based on the costs applied where the vehicle is of a vehicle type A shown in FIG. 4.

Operation Example 2 of Communication
Management System

Figure 6:
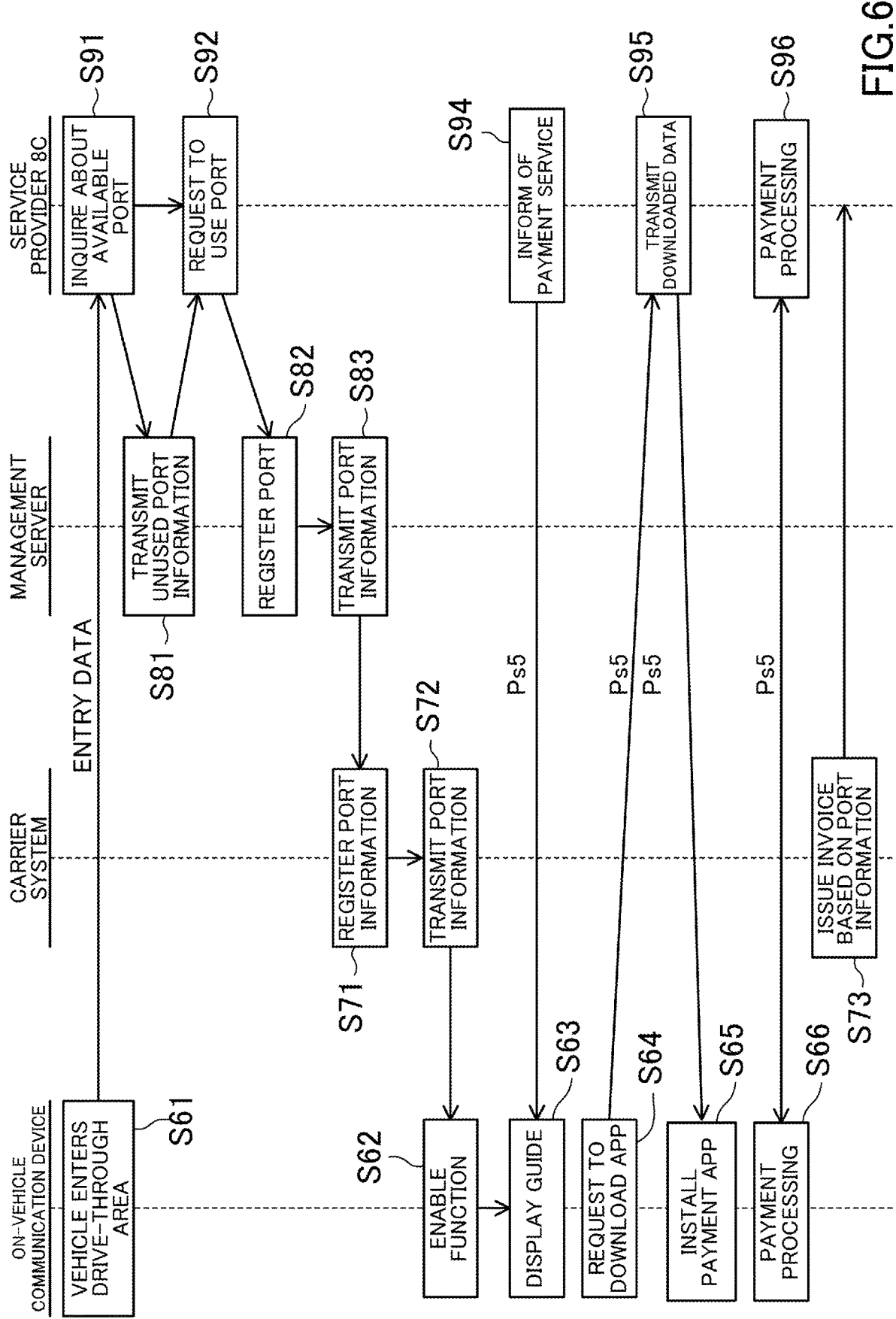
FIG. 6 is a flowchart showing another operation example of the communication management system according to one or more aspects of the present disclosure.

FIG. 6 is a flowchart showing another operation example of the communication management system.

FIG. 6 shows an example operation of the communication management system 1. When a vehicle 5 enters a predetermined area, a service provider 8C actively provides a service guide and the occupant of the vehicle 5 uses the proposed service.

More specifically, with reference to FIG. 6, an example will be described where the occupant of the vehicle 5 uses the drive-through service of a store, receives a use guide for a payment application service and uses the service.

In this operation example as well as in "Operation Example 1 of Communication Management system" described above, the management server 3 executes the flag transmission, and the on-vehicle communication device 2 then executes the port assignment and the data communication.

A detailed description follows with reference to FIG. 6. For the sake of simplicity, the occupant agrees to receive certain data from the service provider 8C. At the start of the flow in FIG. 6, the dedicated ports Ps1 to Ps4 and Ps6 are already registered in the correspondence table 291 shown in FIG. 4.

In step S61, the vehicle 5 enters the drive-through service area provided by the service provider 8C. Upon detection of the entry of the vehicle 5, the service provider 8C inquires of the management server 3 about information on ports available for the vehicle 5 (step S91).

Upon receipt of the inquiry from the service provider 8C, the management server 3 refers to the identification flag information 361 in the storage unit 36 and provides the service provider 8C with unused port information for the target vehicle 5 (step S81). According to the identification flag information 361 on the target vehicle 5, the dedicated ports Ps1 to Ps4 and Ps6 are already registered. The management server 3 thus notifies the service provider 8B of the fact that the dedicated ports Ps5 and Ps7 to Psx are the unused ports, as the unused port information for the target vehicle 5.

Upon receipt of the unused port information for the target vehicle 5 from the management server 3, the service provider 8C requests to register any of the unused ports for the service to be provided (step S92). Here, the service provider 8C requests to register the dedicated port Ps5 for the payment application dedicated to the shop.

Upon receipt of the request to register the dedicated port Ps5 from the service provider 8C, the management server 3 registers the information on the dedicated port Ps5 in the identification flag information 361 on the target vehicle 5 stored in the storage unit 36 (step S82).

In the next step S83, the management server 3 notifies the carrier system 6 of the fact that the data communications for the payment application provided by the service provider 8C are made via the dedicated port Ps5.

Upon receipt of the notification from the management server 3, the carrier system 6 registers the information received from the management server 3 in the database 681 of the storage unit 68 (step S71). In addition, based on the received assignment information (i.e., the identification flag information 361) on the dedicated ports Ps, the carrier system 6 connects the dedicated port Ps5 (not shown) to a port Pe5 (not shown) for the service provider 8C in the network 62. The carrier system 6 transmits the latest identification flag information 361 to the on-vehicle communication device 2 of the target vehicle 5 (step S72).

Upon receipt of the identification flag information 361 from the management server 3, the on-vehicle communication device 2 executes the processing of enabling the function, based on the identification flag information 361 (step S62). Specifically, based on the identification flag information 361, the on-vehicle communication device 2 makes a setting so that the data communications for the payment application provided by the service provider 8C are made via the dedicated port Ps5. After completion of this setting, the communications from the service provider 8C to the on-vehicle communication device 2 of the target vehicle 5 becomes possible.

The service provider 8C then transmits guide information on the payment application to the target vehicle 5 (step S94). Upon receipt of the guide information on the payment application, the on-vehicle communication device 2 of the target vehicle 5 displays a guide screen of the payment application on the display unit 23 (step S63).

Once the occupant requests to download the payment application through the input unit 22, the on-vehicle communication device 2 transmits the request to the service provider 8C (step S64). The payment application is then, as a response, returned from the service provider 8C to the on-vehicle communication device 2 (step S95).

Upon completion of the download, the payment application is installed into the target vehicle 5 (step S65), and payment processing is executed between the target vehicle 5 and the service provider 8C (steps S66 and S96).

Here, the data communications for the payment application are made via the dedicated port Ps5 from the transmission of the guide information on the payment application to the target vehicle 5 in step S94 to the execution of the payment processing in steps S66 and S96.

The computing unit 63 of the carrier system 6 accumulates the data traffic for the payment application via the dedicated port Ps5. The storage unit 68 stores the accumulated data as the traffic used by the dedicated port Ps5, that is, data traffic B5 used for the payment application (step S73). After that, as in step S28 in FIG. 3B described above, the communication carrier charges the service provider 8C for the amount corresponding to the data traffic at the dedicated port Ps5 (step S73).

As described above, the communication management system 1 manages communications between the on-vehicle communication device 2 mounted on each vehicle 5 and the carrier system 6 of the communication carrier using the on-vehicle communication device 2 and the management server 3 located outside the vehicle and configured to manage the on-vehicle communication device 2. Specifically, the management server 3 transmits, to the on-vehicle communication device 2, the identification flag information 361 for identifying a function to be enabled among a plurality of functions of the vehicle 5. Specifically, upon receipt of the identification flag information 361 from the management server 3, the on-vehicle communication device 2 assigns different dedicated ports Ps to the respective functions to be enabled, based on the identification flag information 361. The on-vehicle communication device 2 inputs and outputs the communication data on the respective functions assigned to the dedicated ports Ps via the dedicated ports Ps so that the carrier system 6 accumulates the data traffic for the respective functions.

In this manner, the dedicated ports Ps are set for the respective functions of the vehicle, that is, the transmission source ports are fixed for the respective functions. This allows the carrier system 6 to divide the communication costs into the charge destinations based on the transmission source ports. Accordingly, the communications costs are divided into the charge destinations based on the functions without requiring any complicated processing such as causing each service provider 8 to add identifiers to communication data for respective predetermined data units and/or reading identifiers from the data transmitted by the carrier system 6 and classifying the data. In addition, since different transmission source ports are used, the data traffic is clearly dividable based on the respective functions and/or services even in data communications made at the same time.

Second Embodiment

Figure 7:
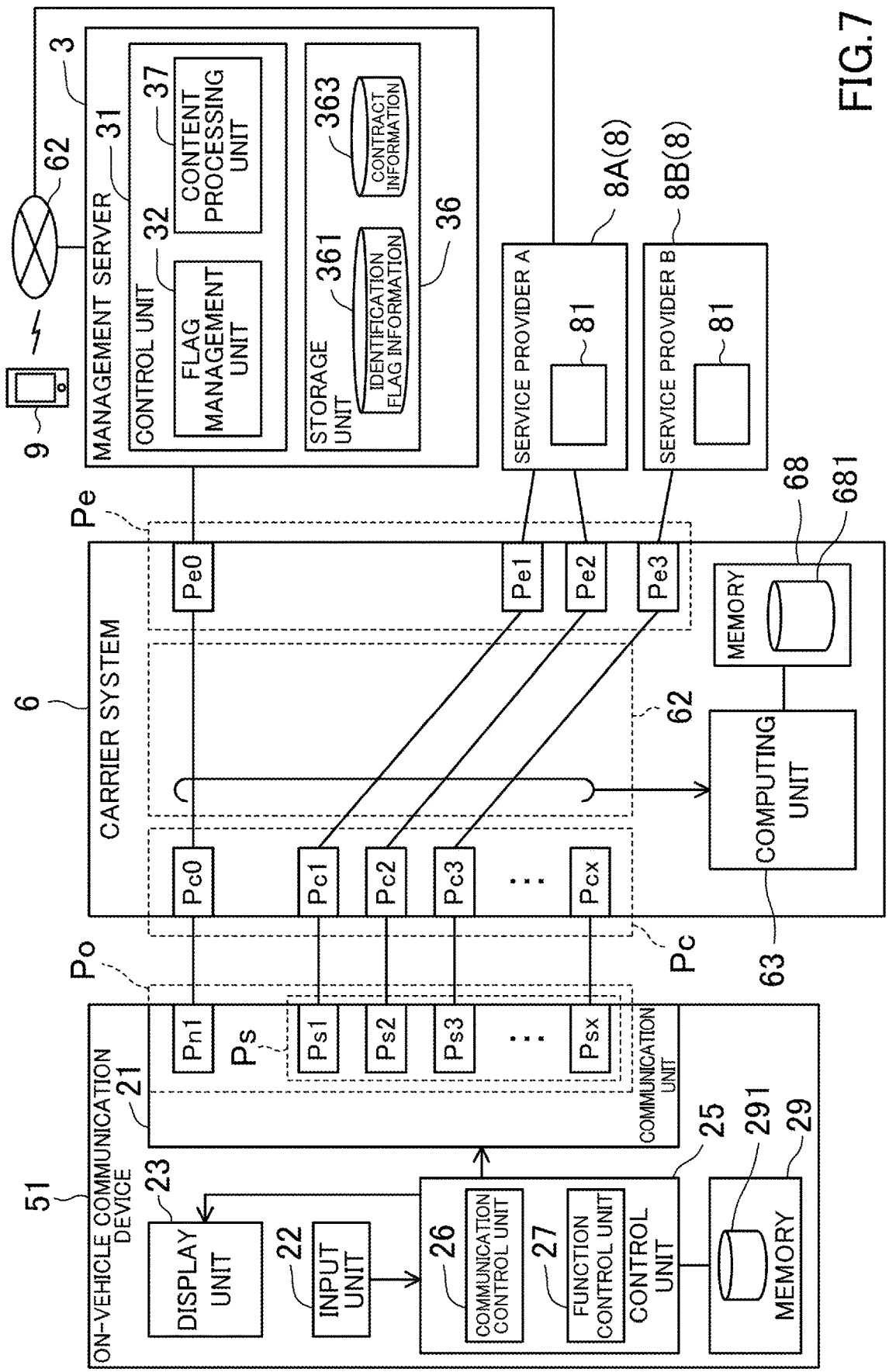
FIG. 7 is a block diagram showing a configuration example of a communication management system according to one or more aspects of the present disclosure.

FIG. 7 shows a configuration example of a communication management system according to a second embodiment. In FIG. 7, the same reference characters as in FIG. 2 are used to represent common elements, and differences from FIG. 2 will be mainly described below.

—Communication Management System—

In FIG. 7, each on-vehicle communication device 2 has the same configuration as in FIG. 2, and the management server 3 has a different configuration from that in FIG. 2.

As in FIG. 2, the management server 3 includes a control unit 31 and a storage unit 36.

The control unit 31 includes a contract management unit 37 in addition to the flag management unit 32 described with reference to FIG. 2. The contract management unit 37 manages the conditions of the contract between an occupant and a service provider 8, and/or manages the type (e.g., the service plan) of the contract between the occupant and the service provider 8.

The storage unit 36 has a similar configuration to the storage unit 36 shown in FIG. 2. In FIG. 7, in addition to the identification flag information 361, the storage unit 36 stores contract information 363 including the details of the contract between the occupant and the service provider 8.

Operation Example 3 of Communication Management System

Figure 8A:
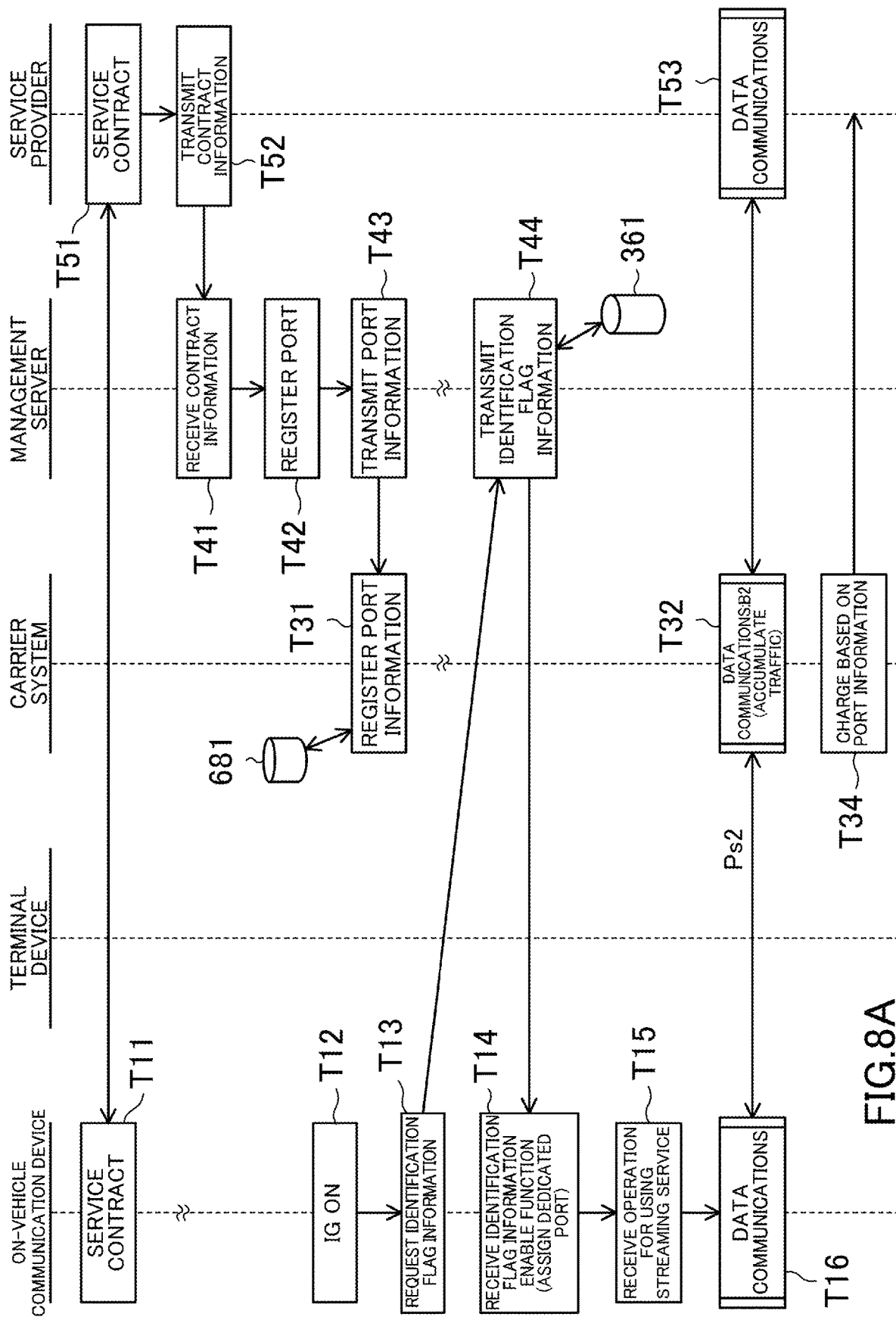
FIG. 8A is a flowchart showing an operation example of the communication management system according to one or more aspects of the present disclosure.

FIG. 8A is a flowchart showing an operation example of the communication management system 1 according to the second embodiment.

In addition to the operation example according to the first embodiment described above, the operation example of FIG. 8A further includes registration. In the registration, upon receipt of the contract information 363 between a vehicle 5 and a service provider 8 for a function to be enabled, the management server 3 registers, in the management table, the contract information 363 and the identification flag information 361 for identifying the function to be enabled. In the flag transmission described above, the management server 3 transmits the identification flag information 361 registered in the registration described above. The subsequent operations in the port assignment and the data communications are the same as in the first embodiment.

A detailed description follows with reference to FIG. 8A. Here, the vehicle 5 under contract with the service provider 8 is referred to as a "target vehicle 5".

First, in steps T11 and T51, contract processing for a specific service for the vehicle (hereinafter referred to as a "specific service") is executed between the on-vehicle communication device 2 of the target vehicle 5 and a server 81 of the service provider 8. Specifically, an ID and a password for the service provider 8A are set between the on-vehicle communication device 2 and the server 81 based on an operation input by the occupant through the input unit 22. With the use of the ID and the password, the on-vehicle communication device 2 logs into the server 81 to execute the contract procedure. In the contract processing for the specific service, the contract information 363 and the identification information unique to the vehicle 5 (hereinafter referred to as "unique identification information") are transmitted from the on-vehicle communication device 2 to the server 81 (i.e., the service provider 8). The unique identification information may be a vehicle identification number (VIN), for example. Here, assume that the streaming service of the service provider 8A is the specific service for which the target vehicle 5 makes a contract.

After conclusion of the contract for the specific service, the service provider 8 transmits the contract information 363 on the contract concluded in the contract processing described above to the management server 3 (step T52).

Upon receipt of the contract information (step T41), the management server 3 performs the processing of registering a dedicated port Ps to be used (step T42). More specifically, upon receipt of the contract information 363 from the service provider 8, the management server 3 refers to the identification flag information 361 in the storage unit 36 and resisters an unused port for the target vehicle 5 for the service to be provided, based on the contract information 363.

The management server 3 refers to the identification flag information 361 in the storage unit 36, and registers, for the "streaming service", an unused port (e.g., the dedicated port Ps2) for the target vehicle 5 at that time.

In the next step T43, the management server 3 notifies the carrier system 6 of the fact that the data communications for the streaming service provided by the service provider 8A are made via the dedicated port Ps2.

Upon receipt of the notification from the management server 3, the carrier system 6 registers the information received from the management server 3 in the database 681 of the storage unit 68 (step T31). In addition, based on the received assignment information (i.e., the identification flag information 361) on the dedicated port Ps, the carrier system 6 connects the dedicated port Ps2 to the port Pe2 for the service provider 8A in the network 62.

The subsequent operations are the same as in FIG. 3B.

Specifically, in step T12, the ignition switch (not shown) of the target vehicle 5 is turned on. In step T13, the on-vehicle communication device 2 of the target vehicle 5 requests the latest identification flag information 361 for identifying the function to be enabled from the management server 3.

Upon receipt of the request for the identification flag information 361 from the on-vehicle communication device 2 of the target vehicle 5, the management server 3 refers to the storage unit 36 and transmits the latest identification flag information 361 to the on-vehicle communication device 2 of the target vehicle 5 (step T44).

Upon receipt of the identification flag information 361 from the management server 3, the on-vehicle communication device 2 executes the processing of enabling the function based on the identification flag information 361 (step T14). Specifically, the on-vehicle communication device 2 assigns different dedicated ports Ps indicated by the identification flag information 361 to the respective functions to be enabled. For example, upon receipt of the information on the streaming service described above as the identification flag information 361, the communication control unit 26 enables an application for the streaming service provided by the service provider 8A. In addition, the communication control unit 26 makes a setting so that the data communications for the streaming service are made via the dedicated port Ps2.

In subsequent step T15, for example, upon receipt of an operation for using the streaming service provided by the service provider 8A, the on-vehicle device 51 starts the application for the streaming service. The on-vehicle communication device 2 starts data communications with the service provider 8A via the dedicated port Ps1. Specifically, a request for voice search is transmitted from the on-vehicle communication device 2 to the service provider 8A (step T16), and a search result is, as a response, returned from the service provider 8A to the on-vehicle communication device 2 (step T53).

The computing unit 63 of the carrier system 6 accumulates the data traffic for the request from the on-vehicle communication device 2 to the service provider 8A and the data traffic for the response from the service provider 8A to the on-vehicle communication device 2. The storage unit 68 stores the accumulated data as the traffic used by the dedicated port Ps2, that is, data traffic B2 used for the voice search service (step T32).

The computing unit 63 of the carrier system 6 accumulates the data traffic (i.e., request and response data) for each dedicated port Ps for each predetermined period (e.g., for each month), and executes the charging processing based on a result of the accumulation. The communication carrier charges a charge destination according to the charge destination information, for the amount corresponding to the data traffic for the predetermined period (step T34). The charge destination information is transmitted in association with the identification flag information received from the management server 3.

In this embodiment as well as the first embodiment, the communication costs are divided into the charge destinations based on the functions without requiring any complicated processing. In addition, since different transmission source ports (i.e., dedicated ports Ps) are used, the data traffic is clearly dividable based on the respective functions and/or services even in data communications made at the same time.

Since the management server 3 sets a dedicated port Ps based on the contract information received from the service provider 8, the service provider 8 only needs to provide the contract information 363 to the management server 3. That is, without requesting any registration and/or other procedure by the service provider 8, the data traffic is clearly dividable based on the respective function and/or services.

Operation Example 4 of Communication Management System

Figure 8B:
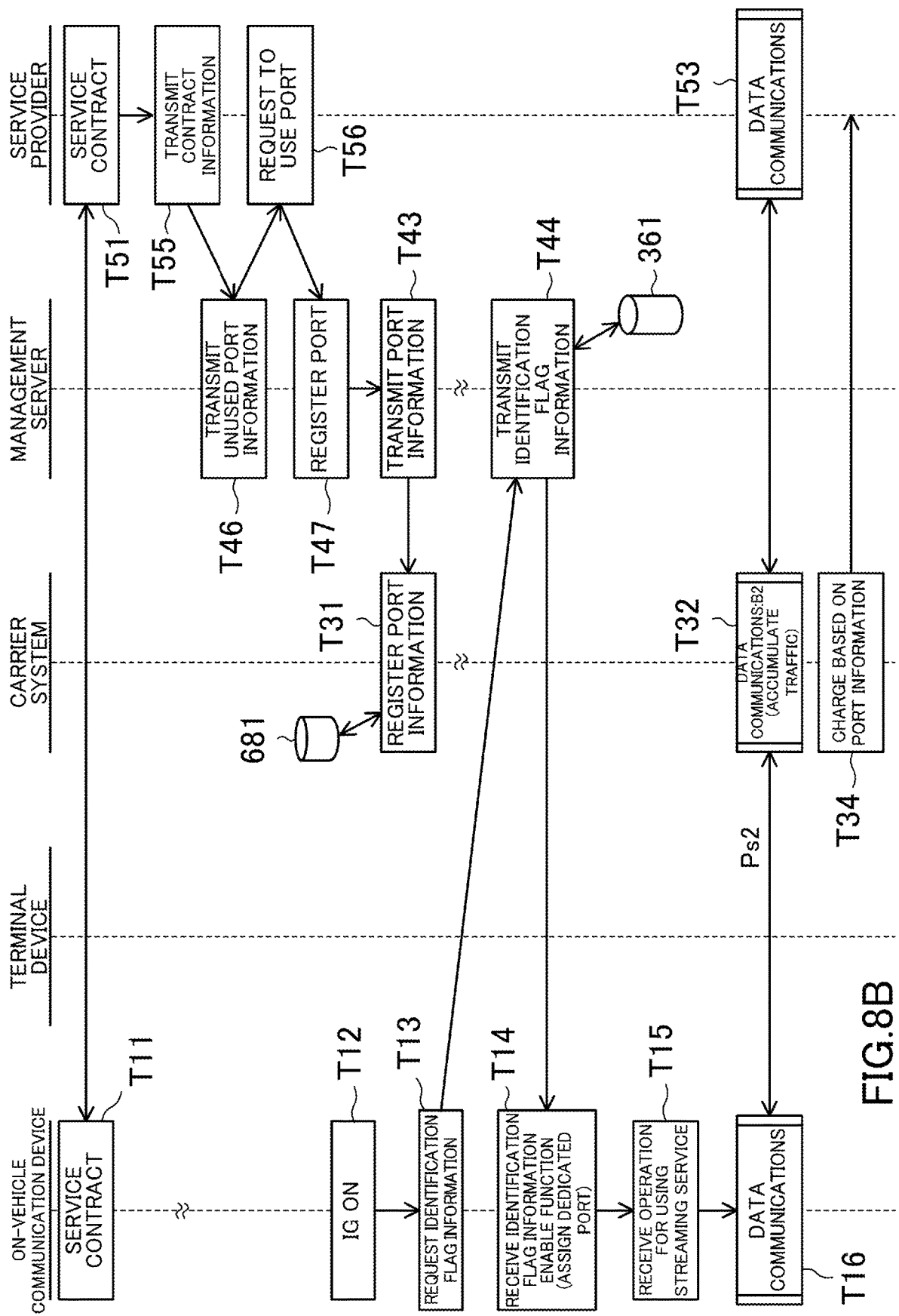
FIG. 8B is a flowchart showing another operation example of the communication management system according to one or more aspects of the present disclosure.

FIG. 8B is a flowchart showing another operation example of the communication management system 1 according to the second embodiment. In FIG. 8B, the same reference characters as in FIG. 8A are used to represent common operations, and differences will be mainly described below. In FIG. 8B as well as FIG. 8A, assume that the streaming service of the service provider 8A is the specific service for which the target vehicle 5 makes a contract.

FIG. 8B differs from FIG. 8A in the operation after executing the contract processing for the specific service.

Specifically, in the FIG. 8B, after conclusion of the contract for the specific service, the service provider 8 performs the procession of registering a dedicated port Ps to be used. The operation of this registration processing is the same as in the port registration in FIG. 3A described above.

First, as in step S41 in FIG. 3A, the service provider 8A inquires of the management server 3 about information on available ports (step T55).

As in step S31 in FIG. 3A, upon receipt of the inquiry from the service provider 8A, the management server 3 refers to the identification flag information 361 in the storage unit 36 and provides the service provider 8A with the unused port information on the target vehicle 5 (step T46).

As in step S42 in FIG. 3A, upon receipt of the unused port information for the target vehicle 5 from the management server 3, the service provider 8A requests to register any of the unused ports for the service to be provided (step T56). Here, the service provider 8A provides the management server 3 with the contract information 363 indicating the details of the contract, in addition to the request to use an unused port. Here, the service provider 8A requests the management server 3 assignment of the dedicated port Ps2 for the streaming service.

As in step S32 in FIG. 3A, upon receipt of the request to use an unused port and the contract information 363 from the service provider 8A, the management server 3 registers the information on the received request to use the unused port in the identification flag information 361 on the target vehicle 5 stored in the storage unit 36 (step T47). In addition, the management server 3 registers, in the storage unit 36, the received contract information 363 in association with the target vehicle 5.

As in step S33 of FIG. 3A, in the next step T43, the management server 3 notifies the carrier system 6 of the assignment of the dedicated port Ps.

As in step S21 of FIG. 3A, upon receipt of the notification from the management server 3, the carrier system 6 registers the information received from the management server 3 in the database 681 of the storage unit 68 (step T31). Accordingly, the same information as the identification flag information 361 of the management server 3 is shared with the carrier system 6.

The subsequent processing is the same as in FIG. 8A. Detailed description thereof will be omitted.

In this example operation as well as in the first embodiment, the communication costs are divided into the charge destinations based on the functions without requiring any complicated processing. In addition, since different transmission source ports (i.e., dedicated ports Ps) are used, the data traffic is clearly dividable based on the respective functions and/or services even in data communications made at the same time.

Operation Example 5 of Communication Management System

Figure 8C:
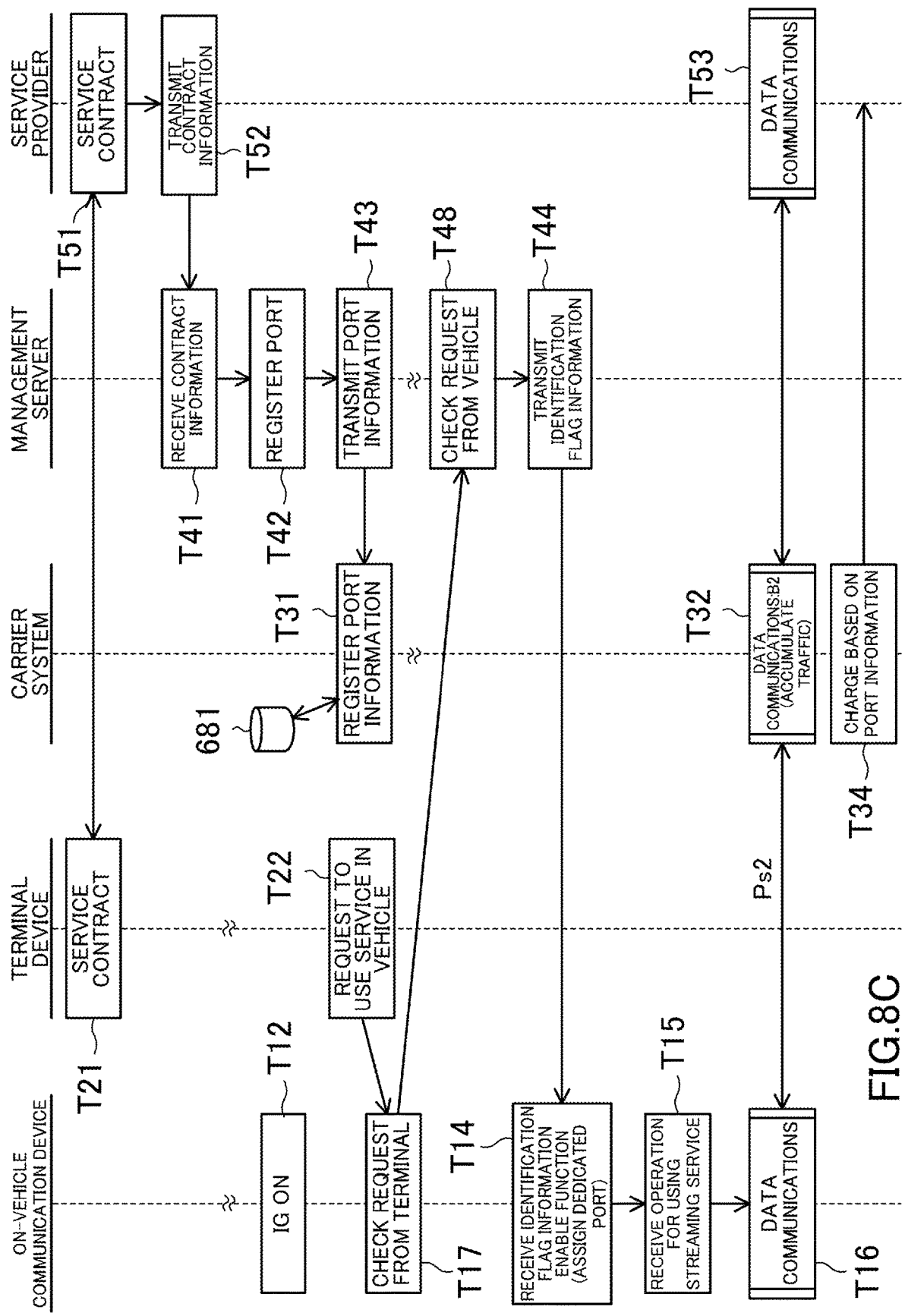
FIG. 8C is a flowchart showing further another operation example of the communication management system according to one or more aspects of the present disclosure.

FIG. 8C is a flowchart showing further another operation example of the communication management system 1 according to the second embodiment. In FIG. 8C, the same reference characters as in FIG. 8A are used to represent common operations, and differences will be mainly described below. In FIG. 8C as well as FIG. 8A, assume that the streaming service of the service provider 8A is the specific service for which the target vehicle 5 makes a contract.

In FIG. 8C, with the use of a terminal device 9 owned by an occupant, the occupant makes a contract for the streaming service provided by the service provider 8A. The portable terminal device 9 requests to use the service from the target vehicle 5. In FIG. 8C, the terminal device 9 of the occupant and the vehicle is connected wirelessly using Bluetooth (registered trademark), Wi-Fi (registered trademark), and/or other means.

First, in steps T21 and T51, contract processing for the specific service is executed between the terminal device 9 and the server 81 of the service provider 8A. The contract processing here is the same as the contract processing in steps T11 and T51 in FIG. 8A.

After conclusion of the contract for the specific service, as in FIG. 8A, the service provider 8A transmits the contract information 363 on the contract concluded in the contract processing described above to the management server 3 (step T52). The subsequent processing in steps T41 to 43 and T31 is the same as in FIG. 8A. The dedicated port Ps2 is connected to the port Pe2 for the service provider 8A in the network 62.

After that, in step T12, the ignition switch (not shown) of the target vehicle 5 is turned on. In step T22, the occupant operates the terminal device 9 within the vehicle to request to use, in the vehicle 5, the specific service (here, the streaming service provided by the service provider 8A) under contract. The terminal device 9 then transmits, to the on-vehicle communication device 2, a request to use the specific service.

Upon receipt of the use request from the terminal device 9, the on-vehicle communication device 2 inquires of the management server 3 via the carrier system 6 about the conditions of the contract for the requested specific service (step T17). Here, the on-vehicle communication device 2 inquires of the management server 3 about the conditions of the contract for the streaming service provided by the service provider 8A.

Upon receipt of the inquiry from the target vehicle 5, the management server 3 refers to the storage unit 36 to check the conditions of the contract for the specific service (step T48) and transmits the latest identification flag information 361 to the on-vehicle communication device 2 of the target vehicle 5 (step T44). Here, the service provider 8A already has a contract for the streaming service. The information indicating that the dedicated port Ps2 is assigned for the streaming service provided by the service provider 8A is thus transmitted as the identification flag information 361 from the management server 3 to the on-vehicle communication device 2 of the target vehicle 5.

As in step S13 in FIG. 3B, upon receipt of the identification flag information 361 from the management server 3, the on-vehicle communication device 2 executes the processing of enabling the function based on the identification flag information 361 (step T14).

After that, upon receipt of the operation for using the streaming service, the on-vehicle communication device 2 starts data communications with one of the service providers 8 via associated one of the dedicated ports Ps. Here, a request for the streaming service is transmitted from the on-vehicle communication device 2 to the service provider 8A (step T16). The streaming contents are, as a response, returned from the service provider 8A to the on-vehicle communication device 2 (step T53).

The computing unit 63 of the carrier system 6 accumulates the data traffic for the request from the on-vehicle communication device 2 to the service provider 8 and the data traffic for the response from the service provider 8 to the on-vehicle communication device 2. The storage unit 68 stores the accumulated data as the traffic used by the dedicated port Ps2, that is, data traffic B2 used for the streaming service (step T32).

The computing unit 63 of the carrier system 6 accumulates the data traffic (i.e., request and response data) for each dedicated port Ps for each predetermined period (e.g., for each month), and executes the charging processing based on a result of the accumulation. The communication carrier charges a charge destination according to the charge destination information, for the amount corresponding to the data traffic for the predetermined period (step T34). The charge destination information is transmitted in association with the identification flag information received from the management server 3.

As described above, in this operation example as well as in the first embodiment, the communications costs are divided into the charge destinations based on the functions without requiring any complicated processing such as causing each service provider 8 to add identifiers to communication data for respective predetermined data units and/or reading identifiers from the data transmitted by the carrier system 6 and classifying the data. In addition, since different transmission source ports are used, the data traffic is clearly dividable based on the respective functions and/or services even in data communications made at the same time.

In the first and second embodiments described above, an example has been described where different dedicated ports Ps are assigned regardless of the service providers, that is, for different services even by the same service provider.

For example, as in the embodiments described above, if the service contents are different from each other, different dedicated ports Ps may be assigned for the respective services regardless of the service providers. Different fully qualified domain names (FQDNs) may be assigned to respective classes of the vehicles 5. In addition, different dedicated ports Ps may be assigned to different service providers, and different FQDNs may be assigned for different service contents so that the communication carrier separately accumulates the data traffic and perform charging processing for the respective service contents.

Third Embodiment

In a third embodiment, an example will be described with reference to FIGS. 9 to 11 where different FQDNs are assigned to respective classes of the vehicles 5. FIG. 9 shows a configuration example of a communication management system according to this embodiment. In FIG. 9, the same reference characters as in FIG. 7 are used to represent common elements, and differences from FIG. 7 will be mainly described below. In the following description, a vehicle CA is of a high-class, type A, whereas a vehicle CB is of a low-class, type B.

—Communication Management System—

In FIG. 9, the on-vehicle communication devices 2 mounted on the vehicles CA and CB have the same configuration as in FIG. 7. In this embodiment, for the sake of simplicity, the dedicated ports Ps of the vehicles CA and CB are assigned for the same service. For example, the dedicated ports Ps1 of both the vehicles CA and CB are assigned for the voice search service provided by the service provider 8A. In FIG. 10, the first ports Pn of the vehicles CA and CB are not shown.

No that the dedicated ports Ps of the vehicles CA and CB may be assigned for different services, which provides the same advantages.

The management server 3 includes a control unit 31, a storage unit 36, and a dynamic server 38. The control unit 31 and the storage unit 36 are the same as in FIG. 7. Detailed description thereof will thus be omitted here.

The dynamic server 38 is what is called a "reverse proxy server", and is, for example, dynamically generated in the management server 3. As the dynamic server 38 includes, for example, different proxy servers for the respective vehicle types. In FIG. 10, the dynamic server 38 includes a first proxy server 381 (FQ1 in FIG. 11) for the high-class, type A, and a second proxy server 382 (FQ2 in FIG. 11) corresponding to the low-class, type B. Specifically, the configuration of a typically known proxy server is applicable. Detailed description thereof will thus be omitted here.

The dedicated ports Ps1 to Ps3 of the vehicle CA are connected to the first proxy server 381 via destination ports Pc1 to Pc3 and ports Pe1 to Pe3 of the carrier system 6. The dedicated ports Ps1 to Ps3 of the vehicle CB are connected to the second proxy server 382 via the destination ports Pc4 to Pc6 and the ports Pe4 to Pe6 of the carrier system 6. Each of the first and second proxy servers 381 and 382 is connected to the service providers 8.

That is, in this embodiment, the management server 3 includes the plurality of reverse proxy servers between the vehicles 5 and the service providers 8. Data communications between the on-vehicle communication devices 2 and the service providers 8 are executed via the reverse proxy servers assigned based on the identification flag information 361. The storage unit 36 has a similar configuration to the storage unit 36 shown in FIG. 7.

In FIG. 7, in addition to the identification flag information 361, the storage unit 36 stores unique identification information 365. The unique identification information 365 includes information for identifying the class of each vehicle, and may be a VIN, for example.

Operation Example of Communication Management System

Figure 10:
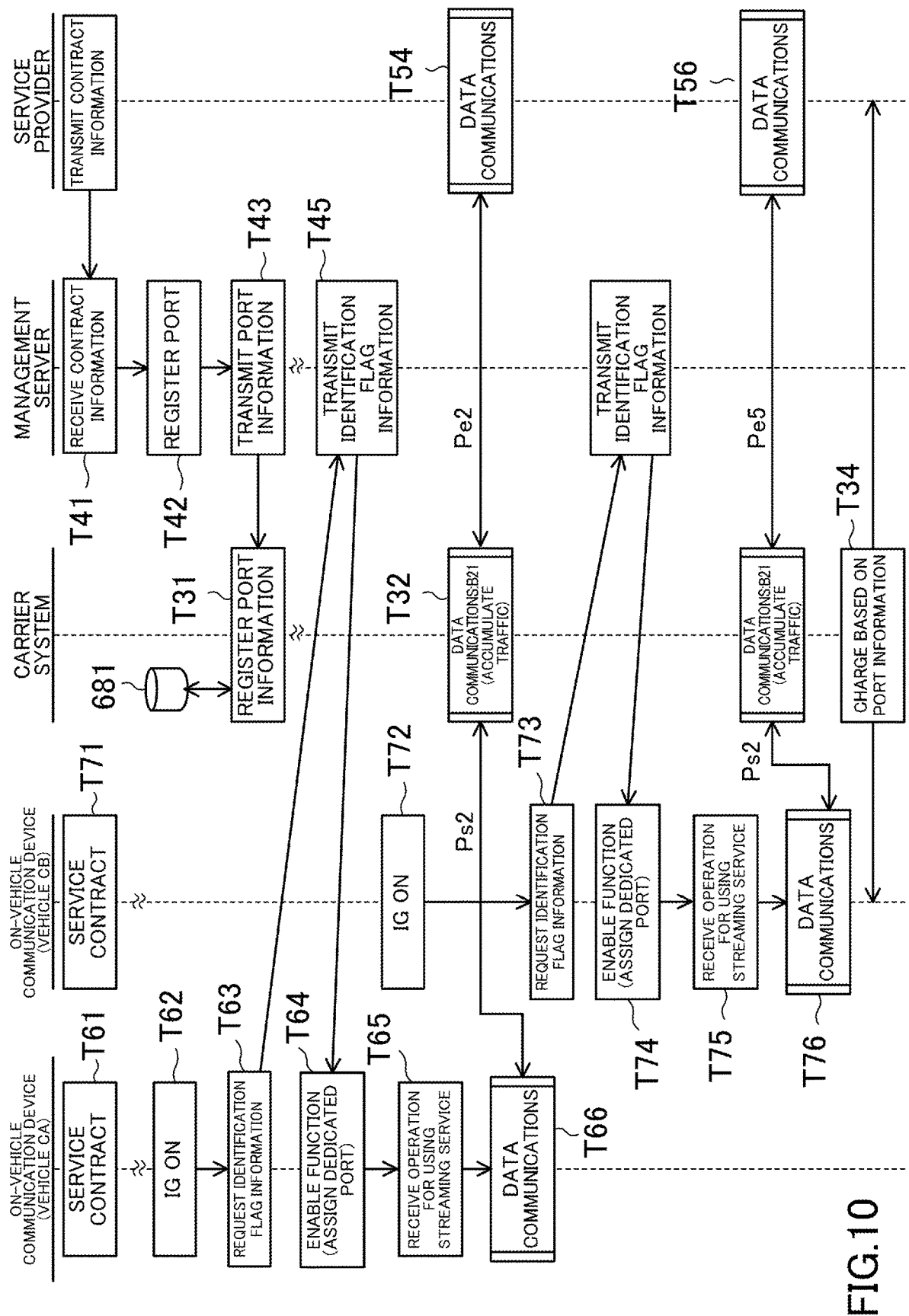
FIG. 10 is a flowchart showing an operation example of the communication management system according to one or more aspects of the present disclosure.

FIG. 10 is a flowchart showing an operation example of the communication management system 1 according to the third embodiment. Here, assume that there are two vehicles 5 under contract with the service provider 8, and are hereinafter referred to as a "target vehicle CA" and a "target vehicle CB". In FIG. 10, the same reference characters as in FIG. 8A are used to represent common operations, and differences will be mainly described below.

In step T61 of FIG. 10, the target vehicle CA makes a contract for the specific service of one of the service providers 8. In step T71, the target vehicle CB makes a contract for the specific service of one of the service providers 8. Here, both the target vehicles CA and CB make a contract for the streaming service of the service provider 8A. In FIG. 11, the target vehicles CA and CB transmit their respective unique identification information 365 at the time of contract.

After conclusion of the contract for the specific service, the service provider 8 transmits, to the management server 3, the contract information 363 on the contract concluded in the contract processing described above in association with the unique identification information 365 on the target vehicles CA and CB (step T52). Here, for example, the service provider 8A transmits, to the management server 3, the contract information 363 on the streaming service with the target vehicles CA and CB in association with the VINs of the target vehicles CA and CB.

Upon receipt of the contract information and the unique identification information 365 (step T41), the management server 3 performs the procession of registering a dedicated port Ps to be used (step T42). More specifically, upon receipt of the contract information 363 from the service provider 8, the management server 3 refers to the identification flag information 361 on the target vehicles CA and CB in the storage unit 36 and resisters an unused port for each target vehicle 5 for the service to be provided, based on the contract information 363. The management server 3 refers to the identification flag information 361 on the target vehicles CA and CB in the storage unit 36, and registers, for the service under contract, an unused port for each target vehicle 5 at that time. Here, as shown in FIG. 11, the dedicated ports Ps2 of the target vehicles CA and CB are both assigned for the streaming service provided by the service provider 8A.

The management server 3 assigns the FQDN of the first proxy server 381 to the target vehicle CA and the FQDN of the second proxy server 382 to the target vehicle CB. Note that the first and second proxy servers 381 and 382 may be configured in advance and/or additionally configured as necessary.

In the next step T43, the management server 3 notifies the carrier system 6 of the fact that the data communications of the target vehicle CA for the streaming service provided by the service provider 8A are made via the dedicated port Ps2 of the target vehicle CA. Similarly, the management server 3 notifies the carrier system 6 of the fact that the data communications of the target vehicle CB for the streaming service provided by the service provider 8A are made via the dedicated port Ps2 of the target vehicle CB.

Upon receipt of the notification from the management server 3, the carrier system 6 registers the information received from the management server 3 in the database 681 of the storage unit 68 (step T31). In addition, based on the received assignment information (i.e., the identification flag information 361) on the dedicated port Ps, the carrier system 6 connects the dedicated port Ps2 of the target vehicle CA to the port Pe2 for the service provider 8A in the network 62. Similarly, based on the received assignment information (i.e., the identification flag information 361) on the dedicated port Ps, the carrier system 6 connects the dedicated port Ps2 of the target vehicle CB to the port Pe5 for the service provider 8A in the network 62.

The subsequent operations are the same as in FIG. 8A. Specifically, in FIG. 10, the operations in steps T62 to T66 for the target vehicle CA are substantially the same as in steps T12 to T16 in FIG. 8A. The operations in steps T72 to T76 for the target vehicle CB are substantially the same as in steps T12 to T16 in FIG. 8A.

After that, upon receipt of the operation for using the streaming service provided by the service provider 8A, the target vehicle CA starts data communications with the service provider 8A via the dedicated port Ps2 of the target vehicle CA (steps T66 and T54). The computing unit 63 of the carrier system 6 accumulates the data traffic for the request from the target vehicle CA to the service provider 8A and the data traffic for the response from the service provider 8A to the target vehicle CA. The storage unit 68 stores a result of the accumulation as data traffic B21 used for the streaming service in the target vehicle CA (step T32).

Similarly, the computing unit 63 of the carrier system 6 accumulates the data traffic for the request from the target vehicle CB to the service provider 8A and the data traffic for the response from the service provider 8A to the target vehicle CB. The storage unit 68 stores a result of the accumulation as data traffic B22 used for the streaming service in the target vehicle CB (step T33).

The computing unit 63 of the carrier system 6 accumulates the data traffic (i.e., request and response data) for each dedicated port Ps for each predetermined period (e.g., for each month), and executes the charging processing based on a result of the accumulation. The communication carrier charges a charge destination according to the charge destination information, for the amount corresponding to the data traffic for the predetermined period (step T34). The charge destination information is transmitted in association with the identification flag information 361 received from the management server 3. For example, assume that the computing unit 63 of the carrier system 6 has received the identification flag information 361 shown in FIG. 11 from the management server 3. The computing unit 63 then charges the service provider 8A for the total amount of the service used by the target vehicle CA, and charges each of the manufacturer and the user for 50% of the service used by the target vehicle CB.

As described above, in this embodiment as well as the first and second embodiments, the communication costs are divided into the charge destinations based on the functions and the data traffic is clearly dividable for respective functions and/or services without requiring any complicated processing.

Employed here is the stage structure of dividing service providers based on the ports, and dividing the vehicle classes based on the FQDNs. Even if different ways of charge are made for respective vehicle classes, no complicated processing is required. This also applies to the case with more service providers and/or more services.

The present disclosure is not limited to the embodiments described above, and may be modified within the scope of the claims. The embodiments described above are merely examples in nature, and the scope of the present disclosure should not be interpreted in a limited manner. The scope of the present disclosure is defined by the appended claims, and all variations and changes belonging to a range equivalent to the range of the claims are within the scope of the present disclosure.

INDUSTRIAL APPLICABILITY

The present disclosure is significantly useful for a system that provides various services from different providers to a vehicle via an on-vehicle communication device.

What is claimed is:

1. A communication management method of managing a communication between an on-vehicle communication device and a communication carrier using the on-vehicle communication device and a management server, the on-vehicle communication device being mounted on a vehicle, the management server placed outside the vehicle and configured to manage the on-vehicle communication device, the communication management method comprising:

flag transmission of transmitting, to the on-vehicle communication device, identification flag information for identifying a function to be enabled among a plurality of functions of the vehicle, using the management server;

port assignment of assigning different dedicated source ports for respective functions to be enabled based on the identification flag information, using the on-vehicle communication device, upon receipt of the identification flag information; and data communications for the respective functions assigned to the dedicated source ports in the port assignment via the dedicated source ports to allow a communication carrier to accumulate data traffic for the respective functions, using the on-vehicle communication device, wherein the identification flag information includes port designation information designating a transmission source port for an assignment destination so that the different dedicated source ports are assigned for the respective functions, and the communication management method further comprising: information provision of providing the communication carrier with information on the transmission source ports assigned for the respective functions, using the management server.

2. The communication management method of claim 1, further comprising:

registration of registering, in a management table, identification flag information for identifying a function to be enabled, upon receipt of contract information on a contract for the function between the vehicle and a service provider that provides a service to the vehicle, using the management server, wherein the flag transmission includes transmitting, as the identification flag information for identifying the function to be enabled, the identification flag information registered in the registration, using the management server.

3. The communication management method of claim 2, wherein the management server includes a plurality of reverse proxy servers, and the data communications of the on-vehicle communication device in the data communication are executed via the reverse proxy servers assigned based on the identification flag information.

4. A communication management method of managing a communication between an on-vehicle communication device and a communication carrier using the on-vehicle communication device and a management server, the on-vehicle communication device being mounted on a vehicle, the management server placed outside the vehicle and configured to manage the on-vehicle communication device, the communication management method comprising:

flag transmission of transmitting, to the on-vehicle communication device, identification flag information for identifying a function to be enabled among a plurality of functions of the vehicle, using the management server;

port assignment of assigning different dedicated source ports for respective functions to be enabled based on the identification flag information, using the on-vehicle communication device, upon receipt of the identification flag information;

data communications for the respective functions assigned to the dedicated source ports in the port assignment via the dedicated source ports to allow a communication carrier to accumulate data traffic for the respective functions, using the on-vehicle communication device; and registration of registering, in a management table, identification flag information for identifying a function to be enabled, upon receipt of contract information on a contract for the function between the vehicle and a service provider that provides a service to the vehicle, using the management server, wherein the flag transmission includes transmitting, as the identification flag information for identifying the function to be enabled, the identification flag information registered in the registration, using the management server.

5. The communication management method of claim 1, wherein the management server includes a plurality of reverse proxy servers, and the data communications of the on-vehicle communication device in the data communication are executed via the reverse proxy servers assigned based on the identification flag information.

6. The communication management method of claim 1, wherein the management server includes a plurality of reverse proxy servers, and the data communications of the on-vehicle communication device in the data communication are executed via the reverse proxy servers assigned based on the identification flag information.

7. The communication management method of claim 4, wherein the management server includes a plurality of reverse proxy servers, and the data communications of the on-vehicle communication device in the data communication are executed via the reverse proxy servers assigned based on the identification flag information.

8. The communication management method of claim 1, further comprising:

executing, by using the on-vehicle communication device, processing of enabling the function, upon receipt of the identification flag information, based on the identification flag information transmitted in the flag transmission, wherein in the processing of enabling, upon receipt of information on a service provider of the function to be enabled as the identification flag information, an application of the service provided for a voice search service and/or for a streaming service is enabled.

9. The communication management method of claim 1, further comprising:

executing, by using the on-vehicle communication device, processing of enabling the function, upon receipt of the identification flag information, based on the identification flag information transmitted in the flag transmission, wherein in the processing of enabling, upon receipt of information on a service provider of the function to be enabled as the identification flag information, an application of the service provided for an Internet radio and/or for a surrounding information providing service is enabled.

10. The communication management method of claim 1, wherein in the port assignment, upon receipt of information on a service provider of the function to be enabled as the identification flag information, the transmission source port that is dedicated to the data communication regarding a payment application of the service provider.

11. An on-vehicle communication device for connecting an on-vehicle device mounted on a vehicle to an external network, the on-vehicle communication device comprising:

a storage unit configured to store a correspondence relationship between respective functions to be enabled out of a plurality of functions of the on-vehicle device and different transmission source ports assigned for the respective functions; and a control unit configured to assign a transmission source port different from the transmission source ports for a new function to be enabled different from the respective functions stored in the storage unit, upon receipt of new identification flag information for identifying the new function from an outside of the vehicle, store information on the assignment, and perform control for information communications for the respective functions, that are enabled, via their respective transmission source ports, wherein the control unit executes, upon receipt of, as the identification flag information, information on a service provider providing an application as the function to be enabled from outside of the vehicle, processing of enabling the application of the service provider.

\* \* \* \* \*